(12) United States Patent
Patel et al.

(10) Patent No.: US 10,965,496 B2
(45) Date of Patent: Mar. 30, 2021

(54) LOGICAL ROUTER COMPRISING DISAGGREGATED NETWORK ELEMENTS

(71) Applicant: Arrcus Inc., San Jose, CA (US)

(72) Inventors: Keyur Patel, San Jose, CA (US); Nalinaksh Pai, San Ramon, CA (US); Randall Bush, San Jose, CA (US); Vikram Ragukumar, Pleasanton, CA (US); Ashutosh Shanker, Milpitas, CA (US); Kalyani Rajaraman, San Jose, CA (US); Robert Austein, Reading, MA (US); Ebben Aries, Highlands Ranch, CO (US); Lalit Kumar, Milpitas, CA (US); Sridhar Pitchai, San Jose, CA (US); Rajkumar Gurusamy, Fremont, CA (US)

(73) Assignee: ARRCUS INC., San Jose, CA (US)

( * ) Notice: Subject to any disclaimer, the term of this patent is extended or adjusted under 35 U.S.C. 154(b) by 0 days.

(21) Appl. No.: 16/696,279

(22) Filed: Nov. 26, 2019

(65) Prior Publication Data
US 2020/0169501 A1    May 28, 2020

Related U.S. Application Data

(60) Provisional application No. 62/771,407, filed on Nov. 26, 2018.

(51) Int. Cl.
*G06F 13/00* (2006.01)
*H04L 12/46* (2006.01)
(Continued)

(52) U.S. Cl.
CPC .......... *H04L 12/4666* (2013.01); *H04L 12/44* (2013.01); *H04L 12/4675* (2013.01);
(Continued)

(58) Field of Classification Search
CPC ............. H04L 12/4666; H04L 41/0668; H04L 49/552; H04L 12/44; H04L 45/02;
(Continued)

(56) References Cited

U.S. PATENT DOCUMENTS 7,583,590 B2     9/2009  Sivakumar
8,051,199 B2 *  11/2011  Li ........................ H04L 61/6004
                                                          709/238
(Continued)

FOREIGN PATENT DOCUMENTS

EP       2571210 B1       4/2017
WO    2015142404 A1       9/2015

OTHER PUBLICATIONS

NEC, "OCP Enabled Switching", NEC White Paper, 2017.
(Continued)

*Primary Examiner* — Kenneth R Coulter
(74) *Attorney, Agent, or Firm* — David R. Stevens; Stevens Law Group

(57) ABSTRACT

A logical router includes disaggregated network elements that function as a single router and that are not coupled to a common backplane. The logical router includes spine elements and leaf elements implementing a network fabric with front panel ports being defined by leaf elements. Control plane elements program the spine units and leaf to function a logical router. The control plane may define operating system interfaces mapped to front panel ports of the leaf elements and referenced by tags associated with packets traversing the logical router. Redundancy and checkpoints may be implemented for a route database implemented by the control plane elements. The logical router may include a standalone fabric and may implement label tables that are used to label packets according to egress port and path through the fabric.

20 Claims, 17 Drawing Sheets

(51) Int. Cl.
    H04L 12/713    (2013.01)
    H04L 12/24     (2006.01)
    H04L 12/939    (2013.01)
    H04L 12/44     (2006.01)
    H04L 12/751    (2013.01)
    H04L 12/723    (2013.01)
    H04L 12/873    (2013.01)
    H04L 12/933    (2013.01)
    H04L 12/931    (2013.01)

(52) U.S. Cl.
    CPC ...... *H04L 41/0668* (2013.01); *H04L 41/0893* (2013.01); *H04L 45/02* (2013.01); *H04L 45/08* (2013.01); *H04L 45/50* (2013.01); *H04L 45/586* (2013.01); *H04L 47/527* (2013.01); *H04L 49/10* (2013.01); *H04L 49/552* (2013.01); *H04L 49/354* (2013.01)

(58) Field of Classification Search
    CPC ..... H04L 45/08; H04L 45/50; H04L 41/0893; H04L 47/527; H04L 49/10; H04L 45/586; H04L 12/4675; H04L 49/354; H04L 41/12
    USPC ............ 709/250, 249, 238–243, 201; 718/1; 370/411, 400–404
    See application file for complete search history.

(56) References Cited

U.S. PATENT DOCUMENTS

| | | |
|---|---|---|
| 9,444,768 B1 | 9/2016 | Raghunathan |
| 9,571,388 B1 | 2/2017 | Ward et al. |
| 10,219,050 B2 * | 2/2019 | Cai .................... H04L 49/70 |
| 2003/0061376 A1 * | 3/2003 | Li .................. H04L 29/12801 709/238 |
| 2004/0090913 A1 | 5/2004 | Scudder |
| 2006/0092940 A1 | 6/2006 | Ansari |
| 2007/0058657 A1 | 3/2007 | Holt |
| 2007/0140240 A1 | 6/2007 | Dally |
| 2012/0033669 A1 | 2/2012 | Mohandas |
| 2013/0058348 A1 | 3/2013 | Koponen |
| 2013/0204921 A1 | 8/2013 | Diaz |
| 2014/0036924 A1 | 2/2014 | Christenson |
| 2014/0146823 A1 | 5/2014 | Angst et al. |
| 2014/0177447 A1 | 6/2014 | Venkataswami |
| 2014/0269415 A1 | 9/2014 | Banavalikar et al. |
| 2014/0280687 A1 | 9/2014 | Egi et al. |
| 2015/0188770 A1 | 7/2015 | Naiksatam et al. |
| 2016/0173400 A1 | 6/2016 | Banavalikar et al. |
| 2016/0373355 A1 | 12/2016 | Zhang et al. |
| 2017/0093636 A1 | 3/2017 | Chanda et al. |
| 2017/0310413 A1 * | 10/2017 | Cai .................... H04L 45/745 |
| 2020/0092228 A1 * | 3/2020 | Cai .................... H04L 49/351 |
| 2020/0169433 A1 * | 5/2020 | Patel .................. H04L 45/586 |
| 2020/0169501 A1 * | 5/2020 | Patel .................. H04L 45/02 |
| 2020/0169516 A1 * | 5/2020 | Patel .................. H04L 47/527 |

OTHER PUBLICATIONS

Broadcom, "Broadcom ships Jericho2: Driving the Merchant Silicon Revolution in Carrier Networks".

Bush, "Link State Over Ethernet", Internet Engineering Task Force, 2018.

* cited by examiner

LOGICAL ROUTER COMPRISING DISAGGREGATED NETWORK ELEMENTS

RELATED APPLICATION

This application claims the benefit of U.S. Provisional Application Ser. No. 62/771,407, filed Nov. 26, 2018 and entitled LOGICAL ROUTER COMPRISING DISAGGREGATED NETWORK ELEMENTS, which is hereby incorporated by reference in its entirety.

BACKGROUND

Data centers have become ever more common and complex. With this complexity comes an increase in the complexity of the networks that enable communication among the computers of a data center. In particular, there is a need to reduce simplify and enable the configuration of network routing capacity for a large number of computers.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
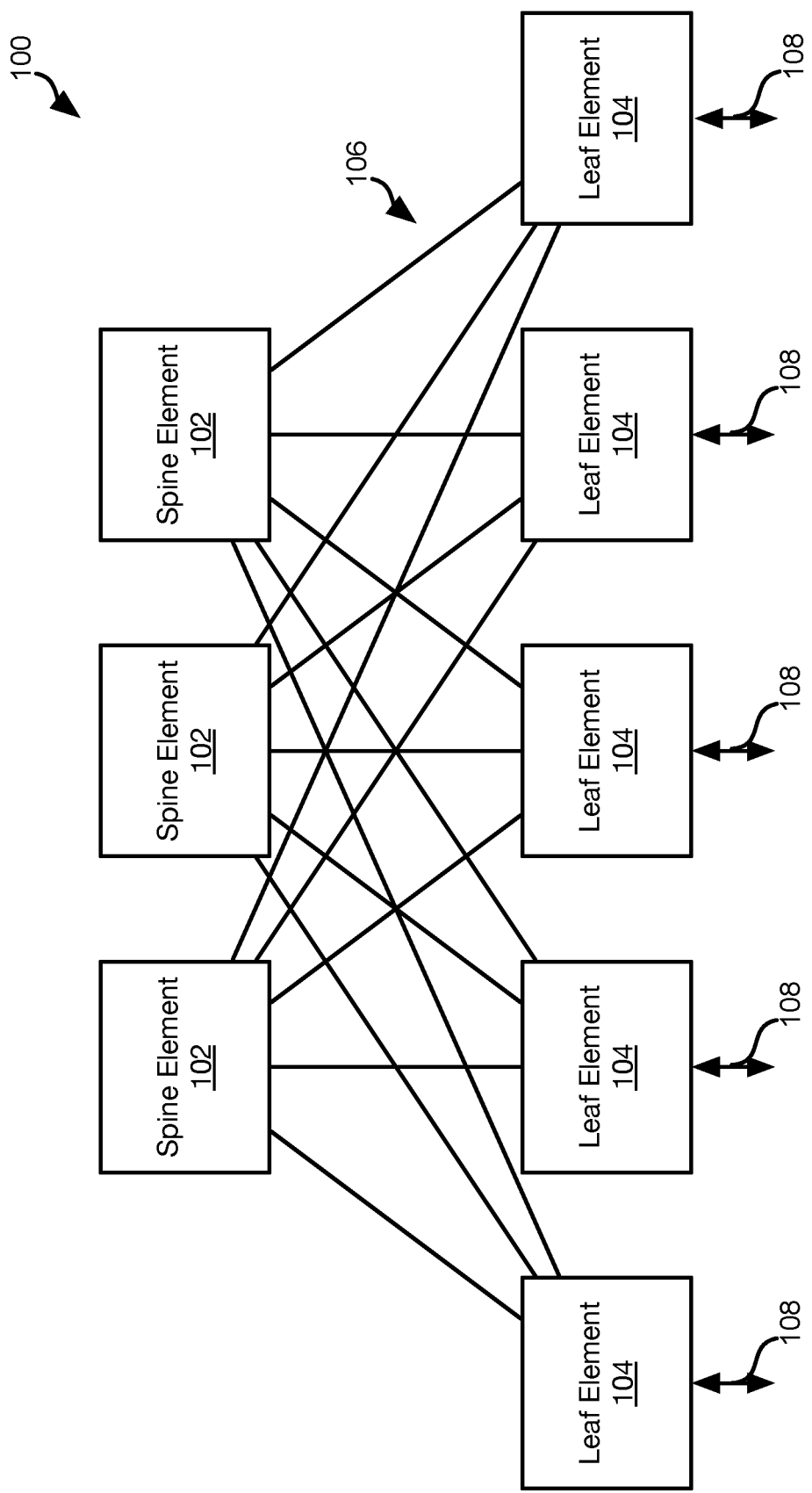
FIG. 1 is schematic block diagram of a logical router in accordance with an embodiment of the present invention.

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Smalltalk, C++, or the like and conventional procedural programming languages, such as the "C" programming language or similar programming languages, and may also use descriptive or markup languages such as HTML, XML, JSON, and the like. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The systems and methods disclosed herein relate to logical routers for computer data routing systems. Specifically, the systems and methods described herein relate to a logical router "chassis" that is formed from a set of disaggregated network elements that are not necessarily in the same chassis or coupled to the same backplane of a chassis. The logical router may include a single logical point of management and control, with a distributed data plane. The logical router also includes a control plane offloaded to an external computing system in order to reduce network topology size. This also allows the control plane to be migrated to a different computer system to take advantage of newer generations of central processing units (CPUs). The disaggregated network elements comprising the logical router may be implemented using dedicated network components incorporated into the systems and methods disclosed herein. In the embodiments disclosed below, the network elements include silicon devices such as the JERICHO 2 and the RAMON developed by BROADCOM. These are exemplary only and other network elements providing the basic network routing function of these devices may also be used in a like manner.

FIG. 1, illustrates an example architecture of a logical router 100. As shown in FIG. 1, the logical router 100 is comprised of multiple spine elements 102, multiple leaf elements 104, and fabric interfaces 106 that couple each spine element 102 to one or more leaf elements 104. In the examples below, the spine elements 102 are RAMON-class silicon devices and the leaf elements 104 are a set of multiple JERICHO 2-class silicon devices. The fabric interfaces 106 of the devices 102, 104 may be coupled to one another by means of network cables, such as 10 G or 100 G ethernet cables, fiber optic cables, or other type of network connection.

In the logical router 100, each spine element 102 functions as a fabric element of a self-routing fabric. This self-routing fabric implements all associated routing protocols in silicon, including handling link failures without requiring any software assistance. Each fabric element in the logical router is interfaced with one or more leaf elements 104 via fabric interfaces, as shown in FIG. 1. A collection of leaf elements 104 may be used to implement a cell-based fabric in which the collection of leaf elements 104 splits data packets into cells. These cells are distributed across the cell-based fabric and reassembled on egress from the one of the leaf elements 104. This implementation allows for more efficient utilization of the fabric. Each leaf element 104 may be also configured with a network interface 108 that allows the leaf element 104 to communicate with a network.

Figure 2:
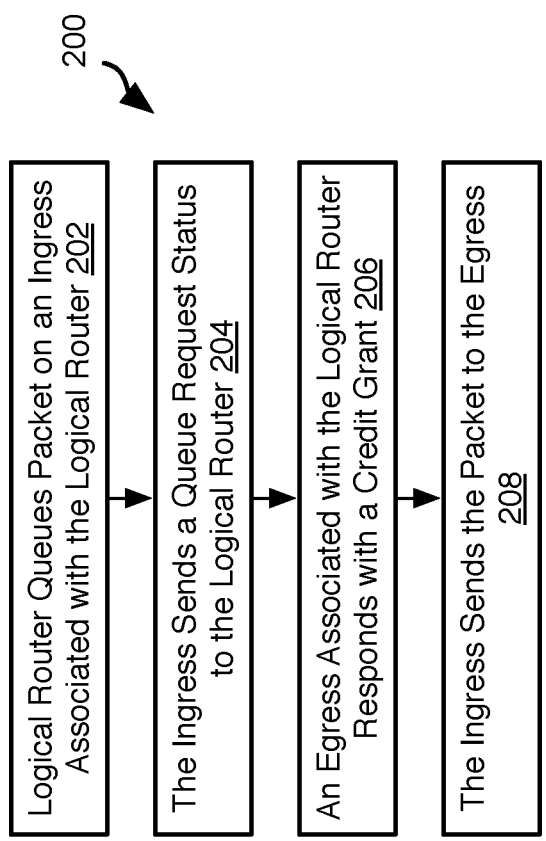
FIG. 2 is a process flow diagram of a method for routing packets in the logical router in accordance with an embodiment of the present invention.

FIG. 2 illustrates an example method 200 that may be implemented using the logical router 100. In particular, the method 200 illustrates an implementation of end-to-end packet scheduling using the logical router 100. The method 200 may be implemented by an external controller (see discussion of control element 300 below) or by code executing on a leaf element 104, such as the leaf element 104 whose ingress port receives the packet being processed according to the method 200.

The method 200 may include queuing 202, by the logical router 100, a data packet on an ingress associated with the logical router 100, such as on one of the leaf elements 104 on whose port the packet was received. Next, the ingress sends 204 a queue request to the logical router 100, such as a to a second leaf element 104 corresponding to the destination address of the data packet. An egress (e.g., the second leaf element 104) associated with the logical router 100 responds with a credit grant. Finally, the ingress sends the packet to the egress, such as over the fabric implemented by the spine elements 102.

Figure 3:
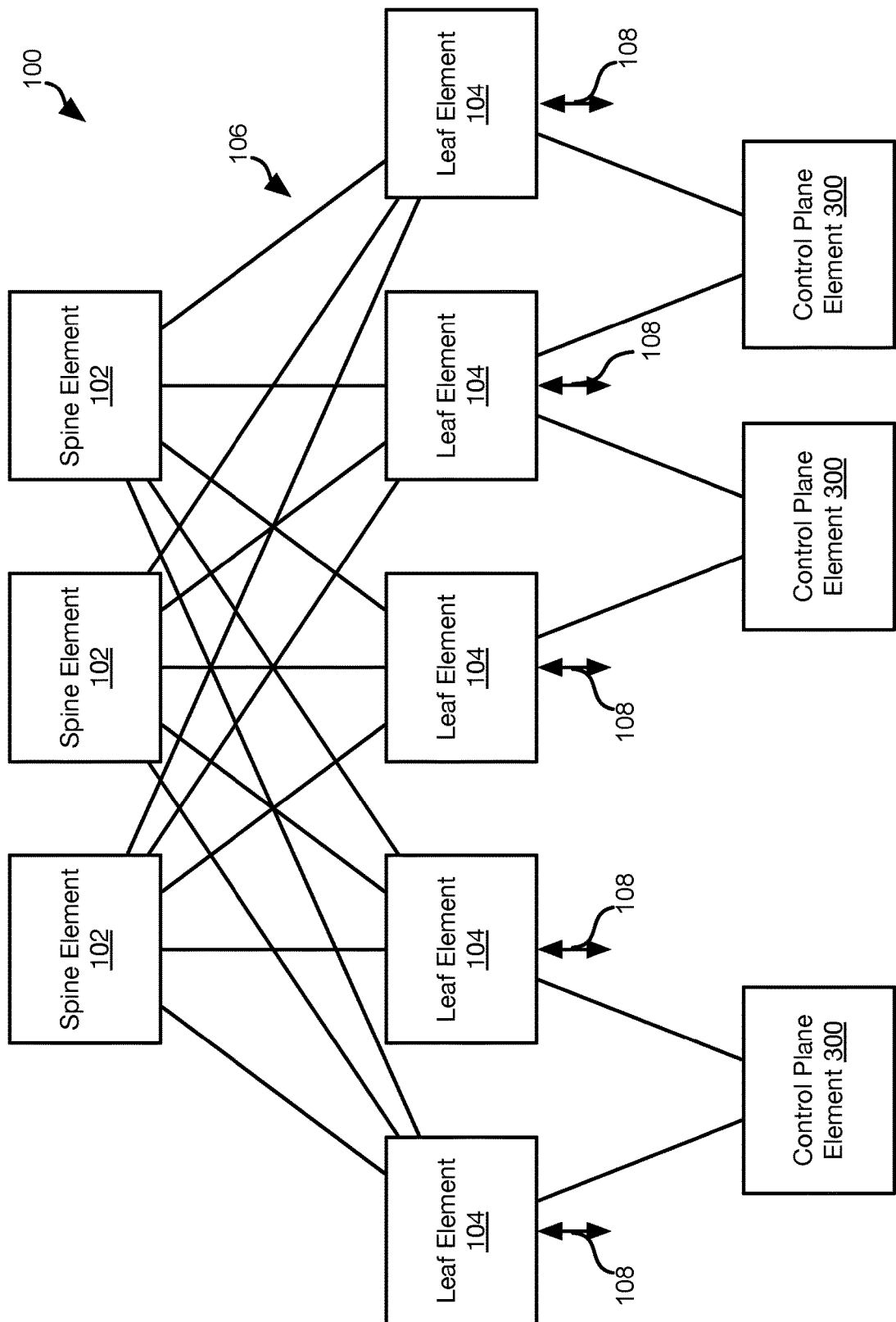
FIG. 3 is a schematic block diagram of the logical router in combination with control plane elements in accordance with an embodiment of the present invention.

Referring to FIG. 3, the logical router 100 as disclosed herein provides desirable performance with respect to the following design considerations:
  System throughput
  Logical chassis provisioning
  Chassis bootstrapping
  Chassis scaling
  System state scaling
  Debugging and troubleshooting
  Resiliency to account for fabric failure, software failure, and component failure In the embodiment of FIG. 3, the spine elements 102 are coupled to the leaf elements 104 to implement a one-stage Clos fabric. In particular, each leaf element 104 may be coupled to each spine element 102.

The system of FIG. 3 may have the following attributes provides a 48 leaf element 104 interface scale with 480×400 G or 1920×100 G ports implemented by the leaf units 104, which may be JERICHO 2 silicon devices. In an alternative scale, there may be 24 leaf elements providing 240×400 G ports or 960×100 G ports. For purposes of this disclosure, the notation "A×B" indicates A ports with a throughput of B.

The configuration of FIG. 3 is for illustrative purposes and other configurations of other devices may be used in a similar manner.

In the illustrated embodiment, there are 13 spine elements 102. The spine elements 102 in the logical router architecture of FIG. 3 may each include one or multiple elements, such as one or multiple RAMON-class elements. In some implementations, a spine profile (i.e., a composition of a spine element 102) may include a single 24-port Ramon-class element, and two 48-port Ramon class elements.

The logical router 100 of FIG. 3 also includes 48 leaf elements. Each spine element 102 may be interfaced with each leaf element 104 using communication links implementing the 400 G QSFP-DD (quad small form-factor pluggable connection double density) optical connectors and 400 G protocols. However, other connector types and protocols may be used. In some implementations, each leaf element 104 is comprised of a single J2-class silicon device including 10×400 or 40×100 interfaces, a BROADWELL (8 core) CPU, and 32 GB of RAM (random access memory). Each leaf element 104 may be configured with 40×100 G interfaces for communicating with external networks.

In some implementations, the logical router 100 may be managed by one or more control plane elements 300 that are implemented using computing systems (see, e.g., the example computing system of FIG. 19 described below). The control plane elements are computer systems that are external to the logical router (i.e. the leaf elements 104, spine elements 102, and interconnecting fabric among these components of the logical router 100). Each control plane element 300 may be interfaced with one or more leaf elements 104 using, for example, 10 G communication links. A control plane element 300 may function as a configuration agent that performs the router state management in order to implement a chassis abstraction model with the logical router 100 such that the separate elements 102, 104 of the logical router function as a single router as if in a common chassis and coupled to a common backplane.

Figure 4:
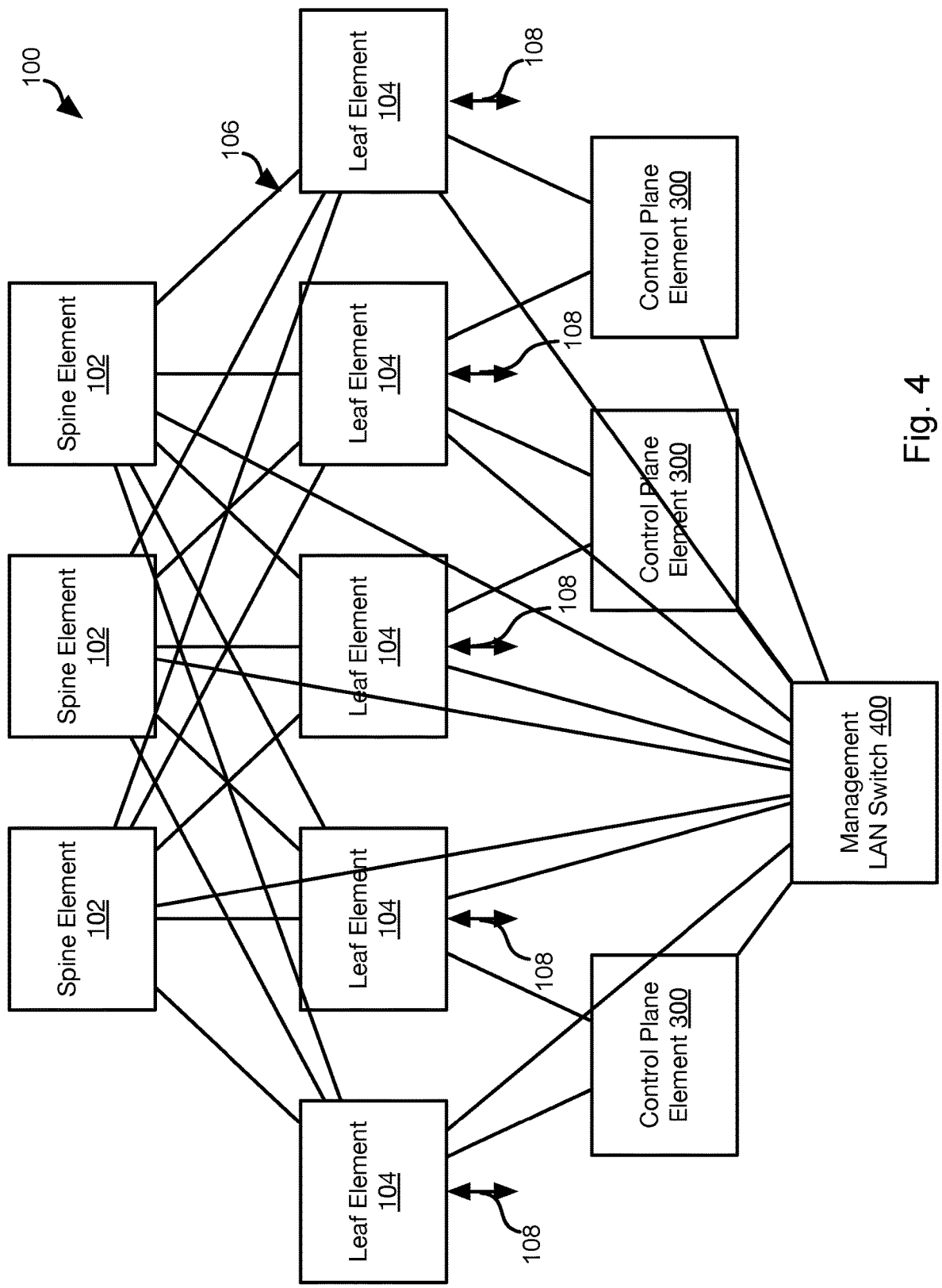
FIG. 4 is a schematic block diagram of the logical router in combination with control plane elements and a management LAN switch in accordance with an embodiment of the present invention.

Referring to FIG. 4, The logical router 100 may be managed by a single point of management and control. A management LAN (local area network) switch 400 that performs all the management and control functions for the logical router 100 and the associated control plane elements 300. The logical router 100 comprising the plurality of spine elements 102 interfaced with a plurality of leaf elements 104 that are, in turn, interfaced with the control plane elements 300 may be managed by the management LAN switch 400. The management LAN switch 400 may be interfaced with each of the spine elements 102, leaf elements 104, and control plane elements 300.

Figure 5:
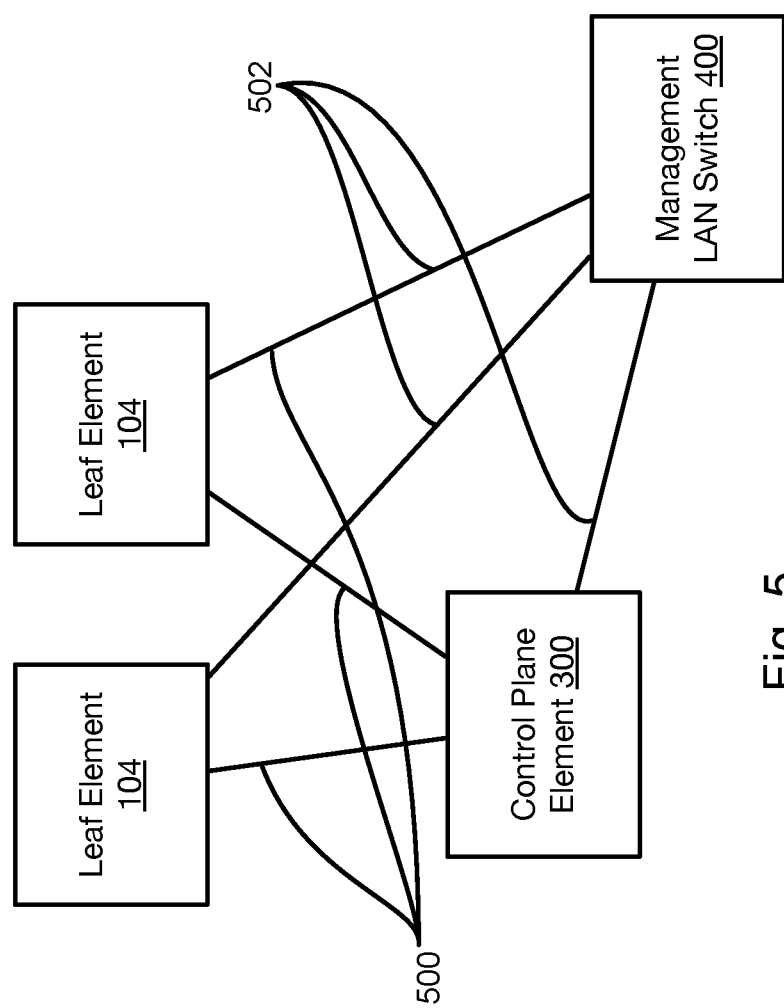
FIG. 5 is a schematic block diagram showing connection of the management LAN switch to the logical router and control plane elements in accordance with an embodiment of the present invention.

Referring to FIG. 5, the LAN switch 400 may be interfaced with elements of the logical router 100 in the illustrated manner. For example, a leaf element 104a and a leaf element 104b may each be independently interfaced with a control plane element 300. Each of the leaf elements 104a, 104b and the control plane element 300 is independently interfaced with the management LAN switch 400. In some realizations, each of the interfaces with the management LAN switch is implemented via a 2×10 G link, though other connection types may also be used.

The interface between each leaf element 104a, 104b and the control plane element 300 may be associated with an in-band network 500 and a host packet path. On the other hand, each interface with the management LAN switch 400 may be associated with an out-of-band (OOB) network 502. The management LAN switch 400 may communicate over the OOB network 502 with the elements 104a, 104b, 300 to perform functions such as bootstrap/image download, system state distribution, and gathering system statistics and similar data.

Figure 6:
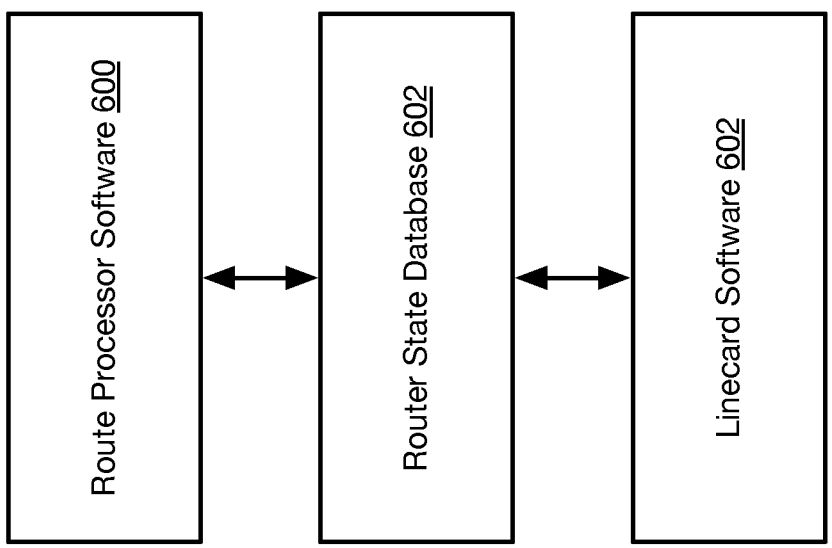
FIG. 6 is a schematic block diagram of components for programming and managing the logical router in accordance with an embodiment of the present invention.

Referring to FIG. 6, the software associated with the logical router 100 may include a route processor software 600, a router state database 602, and linecard software 604 (also referred to herein as linecard software module 604). In some implementations of the logical router 100, all software is deployed and managed as containers. The route processor software 600 may program the device on which it is loaded to bidirectionally share data about the system state and statistics with the router state database 602. The router state database 602 may be programmed to bidirectionally share data about the system state and statistics with the linecard software 604.

In some implementations, the route processor software 600 implements following functions or data structures:
  System wide interface control (across the elements 102, 104 of the logical router 100)
  Routing protocols, ARP (address resolution protocol), IPv6 ND (internet protocol v6 neighbor discovery)
  Routing Information Base (RIB)
  North bound APIs (application programming interfaces)
  Configuration management
  Datastore
  Linux host path
  Telemetry
  Features—ACL (access control list), QoS (quality of service), CoPP (control plane policing)
  Virtual chassis management In some realizations, the router state database 602 includes following functions or data structures:
  Router state
  Statistics
  Sharded
  Replicated
  Clustered In some realizations, the linecard software 604 implements with the following functions or data structures:
  ASIC (application specific integrated circuits)/SDK (software development kit) programming
  Stats
  Linecard offload (BFD (bidirectional forwarding detection), LLDP (link layer discovery protocol), SFlow (sampled flow), etc.)

Figure 7:
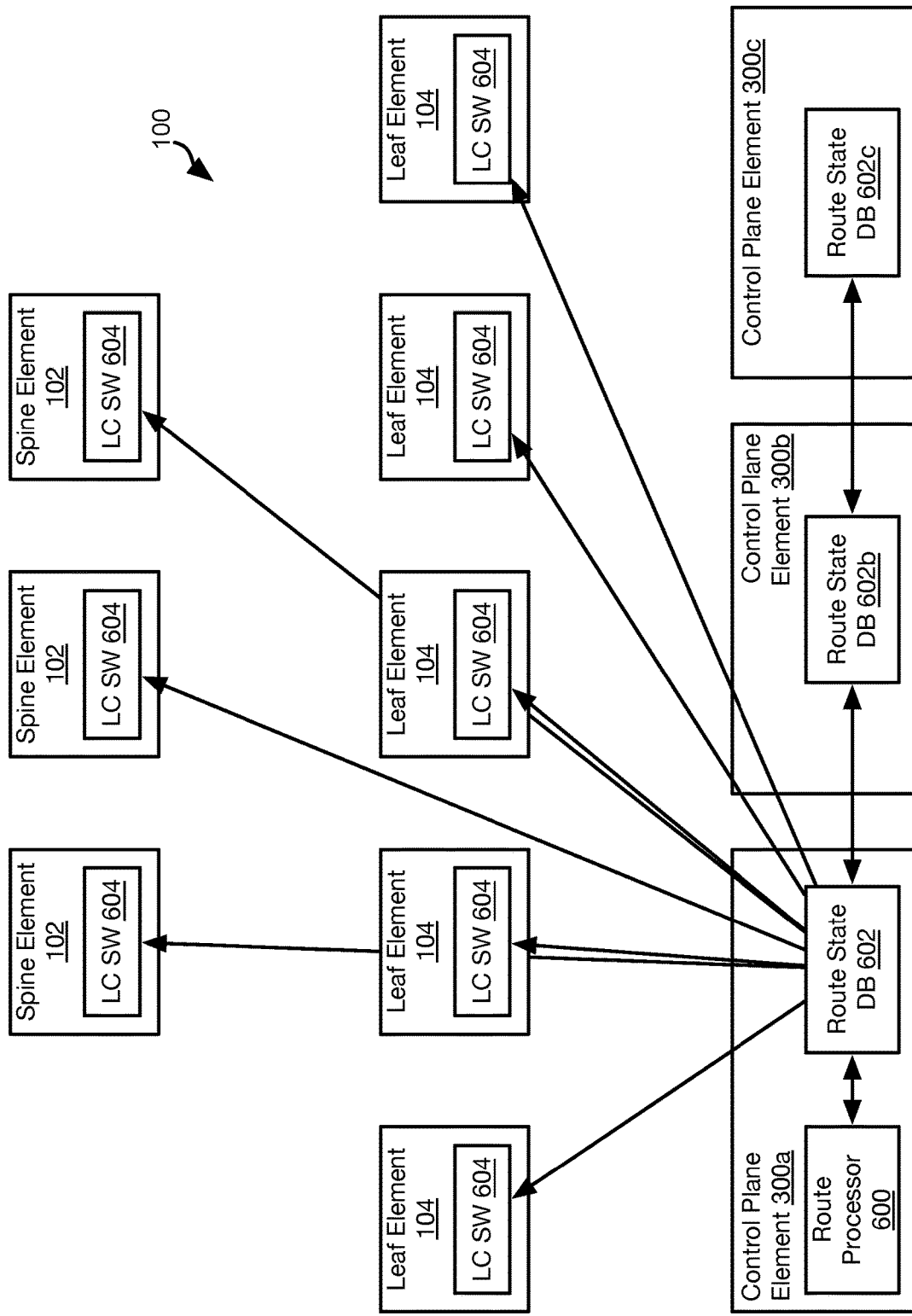
FIG. 7 is a schematic block diagram illustrating the programming of the logical router in accordance with an embodiment of the present invention.

FIG. 7 depicts how the three software building blocks 600, 602, 604 are implemented in an actual logical router realization. As shown in FIG. 7, a separate linecard software module 604 (i.e., instance of linecard software 604) may be implemented in each spine element 102 and each leaf element 104. Each of the linecard software modules 604 communicates with a router state database 602 in a primary control plane element 300 ("router state DB 602a"). This primary control plane element 300a may also execute an instance of the router processor software 600 (also referred to herein as the route processor module 600). The primary control plane element 300a shares data with a first secondary control plane element 300a as shown in FIG. 7. The first secondary control plane element 300b shares data with a second secondary control plane element 300c as shown in FIG. 7. Each of the first secondary control plane element 300a and the second secondary control plane element 300b includes a router state database 602b, 602c, respectively, to implement functions such as data redundancy. The first secondary control plane element 300b and second secondary control plane element 300c may each serve as backups in the event of a failure of the primary control plane element 300a, as discussed herein.

The logical router 100 together with the control elements 300 and management LAN switch 400 as described above with respect to FIGS. 1 through 7 may be used in various operational scenarios described below.

Figure 8:
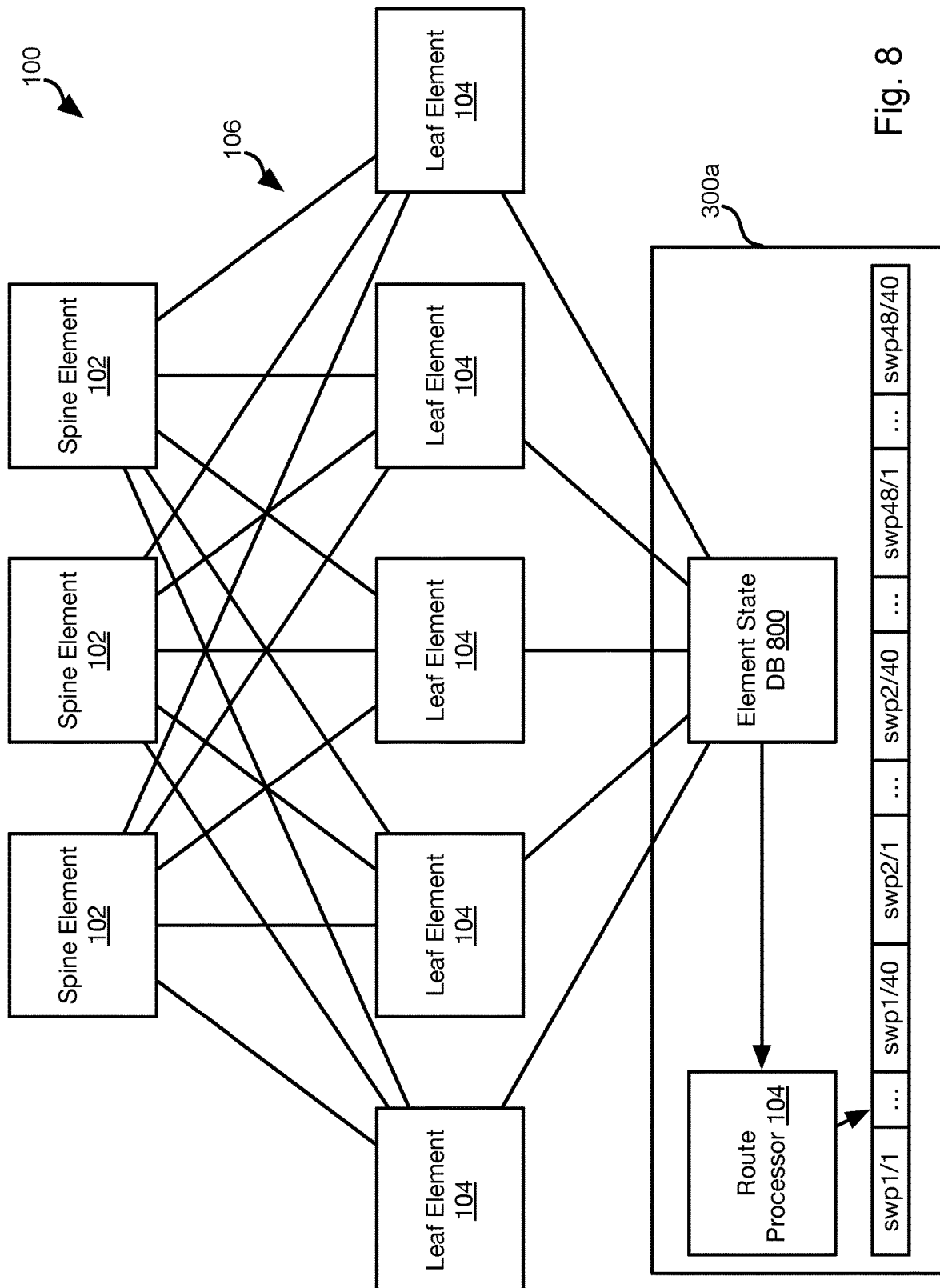
FIG. 8 is a schematic block diagram illustrating the configuration of interfaces of the logical router in accordance with an embodiment of the present invention.

FIG. 8 illustrates a scenario by which the logical router 100 generates interfaces. As seen in FIG. 8, a control plane element 300 running on a LINUX computing system includes an element state database 800 and a route processor 600. Although LINUX computing systems are described throughout, other operating systems may also be used, such as other variations of UNIX, MACOS, MICROSOFT WINDOWS, or other operating systems known in the art.

The element state database 800, which may be part of or equivalent to the router state database 602, may be coupled to each spine element 102 and leaf element 104 forming part of the logical router 100. The element state database 800 may store data associated with each spine element 102 and leaf element 104, such as its configuration (ports, connections of ports to other elements 102, 104, 300, addresses of elements 102, 104, 300, etc.). This information may be discovered by the control plane element 300 using any of the fabric discovery techniques disclosed herein (e.g., LSoE, LLDP). The element state database 800 provides this data to the route processor. For each interface on each spine element 102 and leaf element 104, the route processor 600 creates a unique interface (swp1/1 . . . swp1/40, swp2/1 . . . swp2/40 . . . swp48/1 . . . swp48/40 in FIG. 8) on the route processor 600 itself, where the notation swpA/B indicates the interface on port B of element A (i.e., spine element 102 or leaf element 104). The unique interface may be a Linux interface. Where another type of operating system is used, a network interface according to that operating system may be created. The route processor may create all interface states for all of the disaggregated elements 102, 104 of the logical router 100. A flow diagram illustrating the creation of the unique interfaces is shown in FIG. 9.

Figure 9:
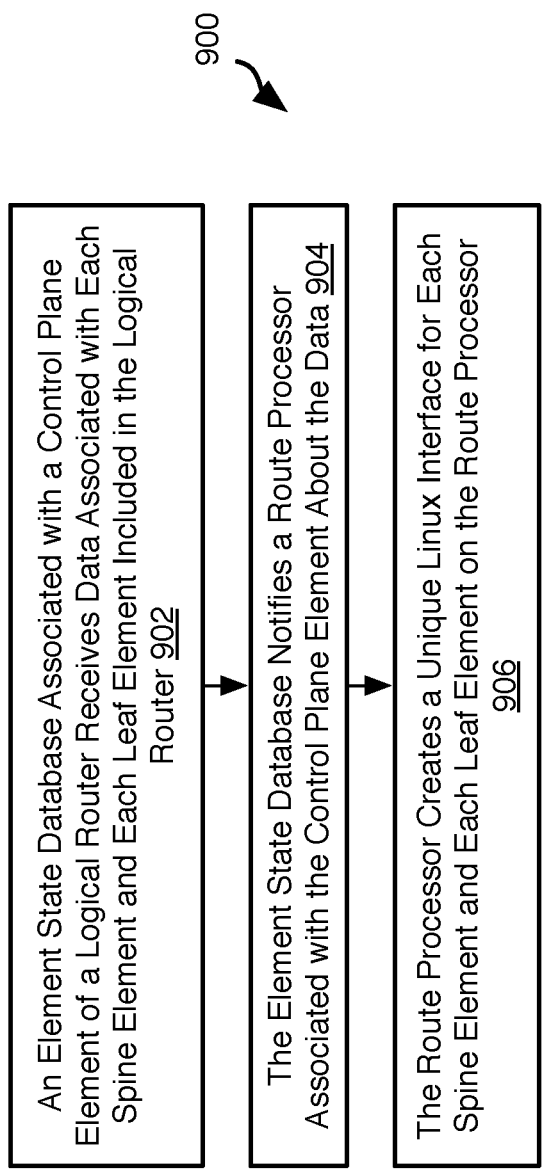
FIG. 9 is a process flow diagram of a method for configuring the interfaces of the logical router in accordance with an embodiment of the present invention.

Referring to FIG. 9, a control plane element 300 may execute the illustrated method 900. The method 900 includes the element state database 800 of a control plane element 300 receiving 902 data associated with reach spine element 102 and leaf element 104 of a logical router 100. The element database 800 notifies 904 the route processor 600 executing on the control plane element 300 about the data received at step 902. The route processor then creates 906 a unique interface, such as a LINUX interface, for each spine element 102 and leaf element 104 referenced in the data received at step 902.

Once the interfaces have been created inside a LINUX (or other operating system) instance on the control element 300 executing the route processor 600, the actual interface on the front panel of the individual leaf elements 104 may then be 'stitched' to the created interfaces corresponding to them. One way to do this is to allocate a unique VLAN (virtual LAN) tag to each front panel interface on each of the leaf elements 104, each VLAN tag being further mapped to one of the interfaces created on the control element 300.

Figure 10:
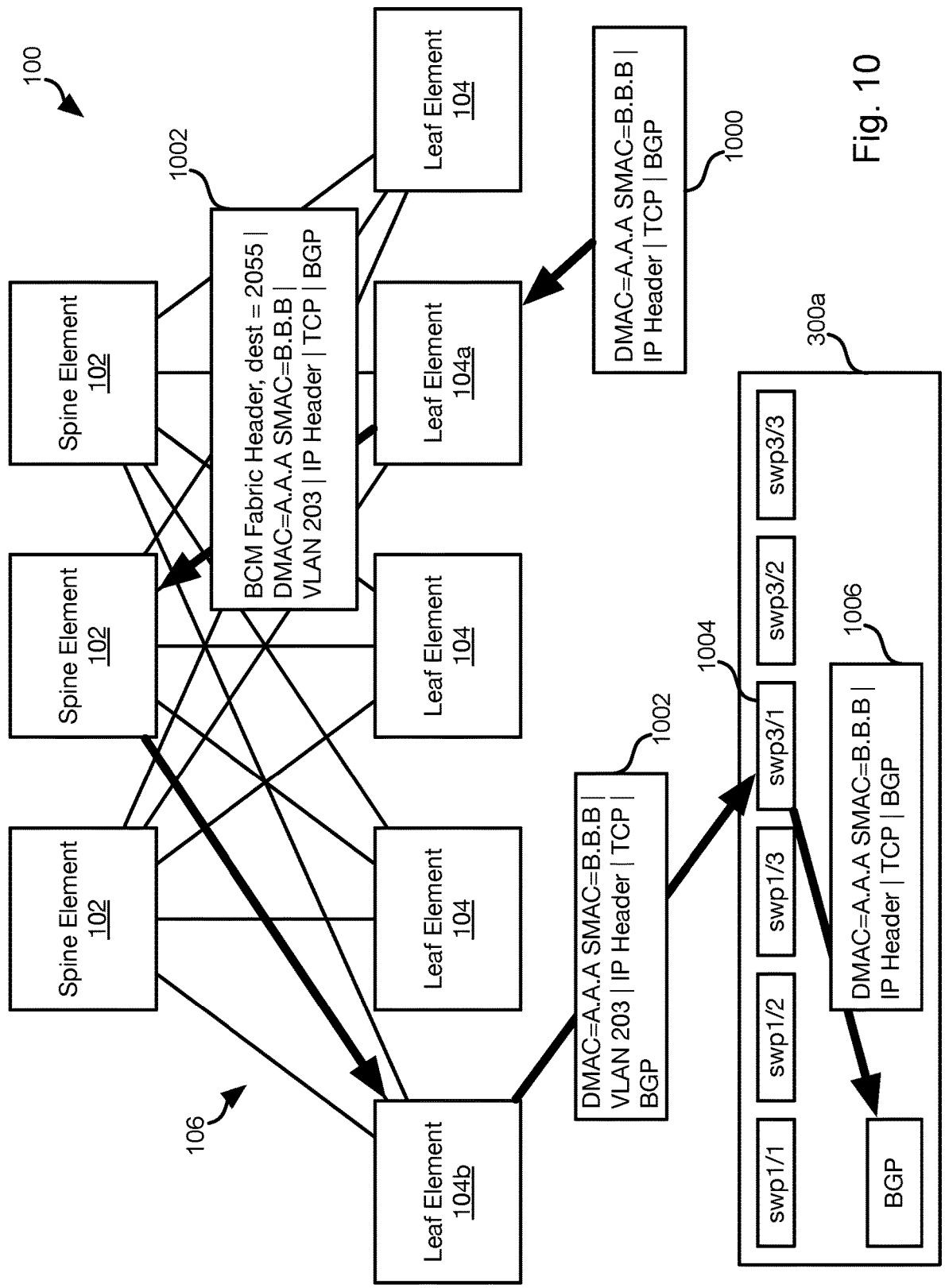
FIG. 10 is a schematic block diagram illustrating the routing of packets with interface labels within the logical router in accordance with an embodiment of the present invention.

FIG. 10 illustrates an example of data packet routing using interfaces created according to the method 900 and associated with interfaces of leaf elements 104. The software running on the leaf elements 104a receives a packet 1000 and programs a rule in the data path that looks up the ingress interface corresponding to the destination of the packet 1000 and adds the corresponding VLAN tag to the packet to obtain a packet 1002 and forwards the packet 1002 to a leaf element 104b connected to the control plane element 300 along with a destination identifier identifying the egress port of the leaf element 104b. The packet 1002 may be sent to the leaf element 104b without performing a TTL (time to live) decrement. The packet 1002 is sent to the egress leaf element 104b by way of one or more spine elements 102. As is apparent in FIG. 10, the packet 1002 may include information for routing the packet 1002 through the fabric 106, e.g. "BCM Fabric Header, dest=2005" (BCM=BROADCOM).

The egress leaf 104b forwards the packet 1002 to the control plane element 300 upon receipt. The LINUX instance executing on the control plane element 300 then identifies the interface 1004 referenced by the VLAN tag of the packet 1002, strips out the VLAN tag, and injects the stripped packet 1006 into the corresponding interface 1004. From there on the packet 1006 flows through the Linux data path as usual and the applications, such as the border gateway protocol (BGP) module 1008, see that packet as coming in on the interface 1004.

Figure 11:
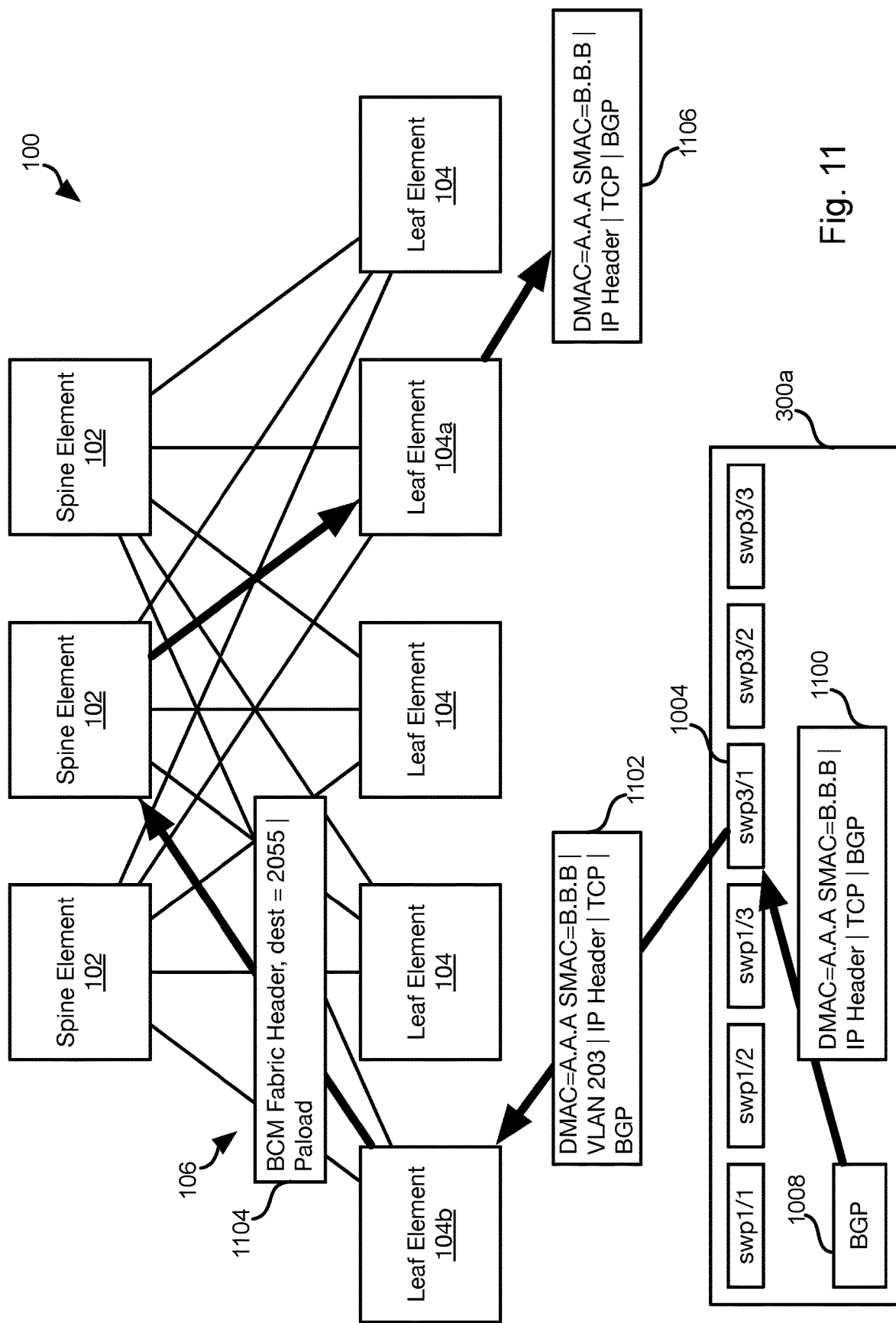
FIG. 11 is a schematic block diagram illustrating the routing of packets with interface labels within the logical router in a reverse direction in accordance with an embodiment of the present invention.

FIG. 11 shows transit in the reverse direction relative to that shown in FIG. 10. The application 1008 injects a packet 1100 into the appropriate interface 1004 according to the destination of the packet and routing defined by the routing database 602. A data path, such as a LINUX data path, may have been programmed to map each interface to a VLAN tag that uniquely identifies the egress front panel interface for the destination address of the packet.

In particular, the ingress leaf 104b (connected to the control plane element 300) receives the packet 1100 from the application 1008 and looks up the VLAN tag for the appropriate egress leaf 104a, i.e. the egress leaf to which the packet should be routed according to the programming according to the routing database 602 as described above. The ingress leaf 104b tags the packet 1100 with the VLAN tag and forwards the tagged packet 1102 to the egress leaf 104a through the elements 102, 104 of the logical router 100 (see packet 1104). The egress leaf 104a strips off the VLAN tag and forwards the stripped packet 1106 out of the correct front panel port, i.e. the front panel port associated with the VLAN tag and corresponding to routing corresponding to the destination of the packet and the programming according to the routing database 602.

Figure 12:
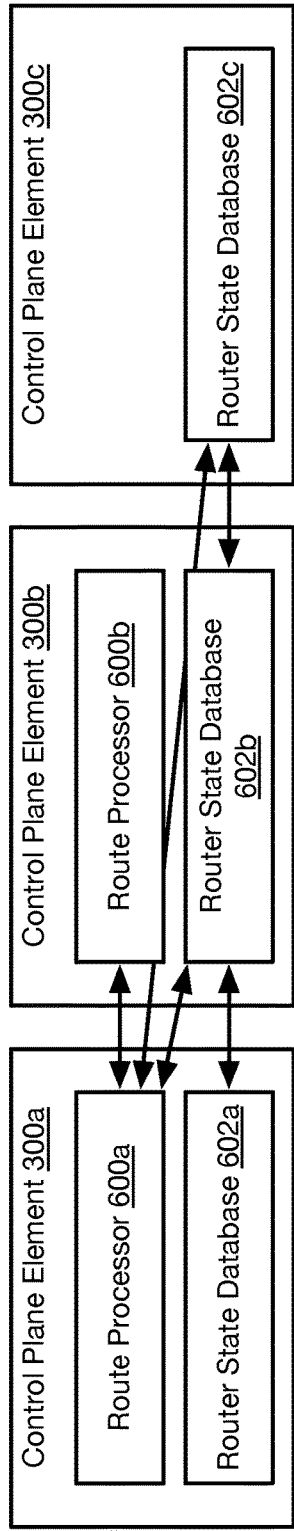
FIGS. 12, 13, and 14 are schematic block diagrams illustrating the implementation of redundancy and fail over among control elements of the logical router in accordance with an embodiment of the present invention.
Figure 13:
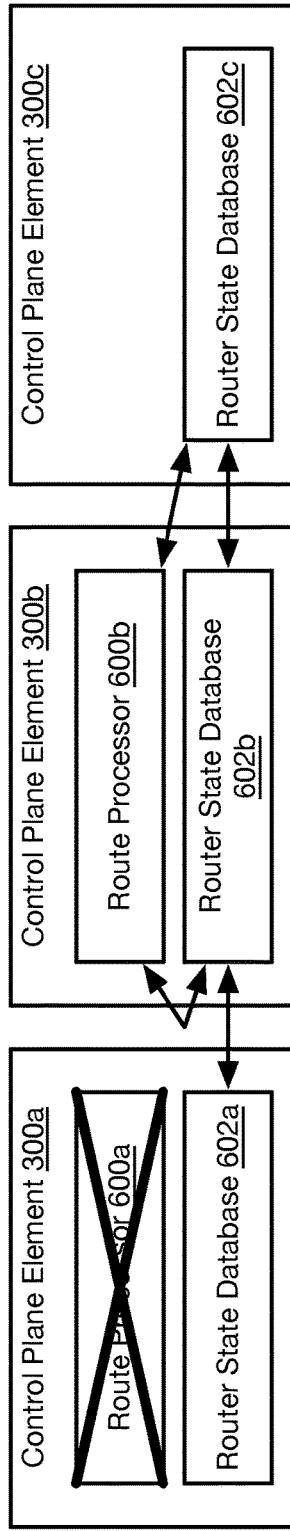
Figure 14:
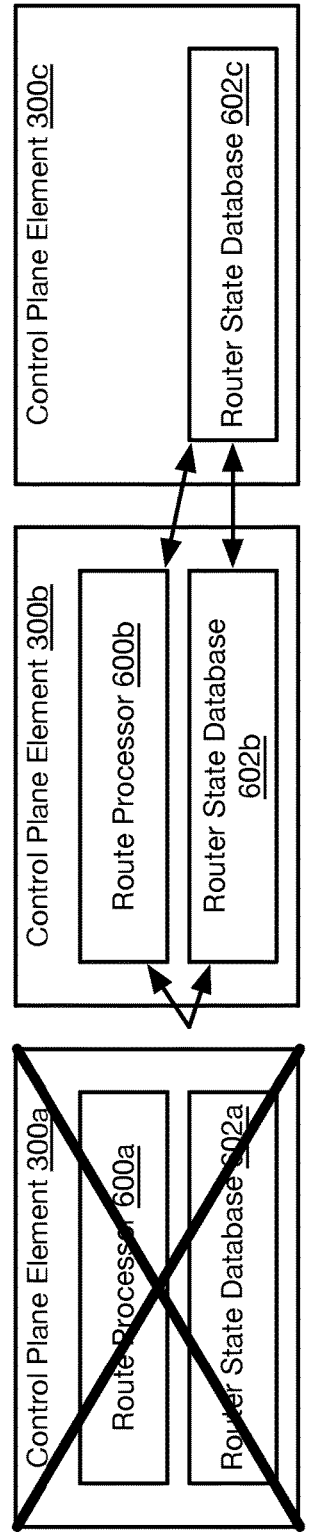

Referring to FIGS. 12, 13, and 14, the logical router 100 and control plane elements 300 may be programmed to implement some or all of the following functions:

Process-level restart
Route processor redundancy
Route state database redundancy
Fabric element, link failure The examples of FIGS. 12, 13, and 14 and their corresponding discussion illustrate how an implementation including multiple control plane elements 300 may be used to provide a logical router 100 that is robust to failures.

FIG. 12 illustrates configurations of control plane elements 300 for implementing a high-availability logical router 100. A three-node control plane element cluster includes control plane elements 300a, 300b, 300c as shown in FIG. 12. Control plane element 300a a primary control plane element that runs an instance 600a of the route processor 600 that is designated as a primary route processor 600a. Control plane element 300b executes an instance 600b of the route processor 600 that is designated as a secondary route processor 600b. Control plane element 300c does not execute an instance of the route processor 600 in this example.

Each control plane element 300a, 300b, 300c may include an individual router state database 602a, 602b, 602c, respectively. Each of route processor 600a, 600b runs health check diagnostics on the other route processor 600b, 600a (600b checks 600a, 600a checks 600b). The primary route processor 600a may be interfaced with each router state database 602a, 602b, 602c in each of the control plane elements 300a, 300b, 300c as shown in FIG. 12.

The router state database 602a in the control plane element 300a shares health check replication data with the router state database in the control plane element 300b. The router state database 602b shares health check replication data with the router state database 602c in the control plane element 300c. In this way, data associated with the health of the primary and secondary route processors 600a, 600b is redundantly stored over multiple databases 602a, 602b, 602c.

In some implementations, the primary route processor 600a checkpoints a required state in the router state databases 602a, 602b, 602c. The router state databases 602a, 602b, 602c may be spawned on all cluster nodes, as illustrated in FIG. 12. Furthermore, data shards of the router state databases 602a, 602b, 602c may be replicated internally for redundancy, and each route processor 600a, 600b may perform internal health checks to detect failovers. In an event that a health check on the primary route processor 600a fails, the secondary route processor shown 600b can become the primary route processor and take over the functions of the primary route processor 600a, as shown in FIG. 13.

FIG. 13 illustrates the failure of the primary router 600a and transfer of primary status to the secondary route processor 600b. As shown, the secondary route processor 600b establishes connections with each of the router state databases 602a, 602b, and 602c, and reads checkpointed data to restore the system state (e.g., state of the secondary route processor 600b per the checkpoint and/or states of the elements 102, 104 of the logical router 100. The secondary route processor 600b thus takes over the role of the primary route processor 600a. In this way, connections with neighboring control plane elements 300a, 300c may be reestablished, and a graceful restart may be initiated. For example, the function of the new primary route processor 600a may continue as described above with respect to the function of the route processor 600a once the system state has been restored.

Referring to FIG. 14, some implementations may also include a provision to account for a failure of a primary control plane element 300a. An example scenario where the master control plane element fails is shown in FIG. 14.

In the case of failure of the primary control plane element 300a, the control plane element 300b hosting the secondary route processor 600b may assume the role of the master control plane element in response to detecting failure during one of its health checks on the primary route processor 600a. The route processor 600b will then assume the role of the primary route processor and establishes connections with the healthy router state databases 602b, 602c as shown in FIG. 14. The route state databases 602b, 602c may be configured to internally handle any shard failovers associated with the failure of the primary control plane element 300a.

The embodiment described above with respect to FIGS. 1 through 14 may provide the following functions and benefits:

A Clos based fabric based on existing silicon networking devices, such as JERICHO 2 and RAMON-class devices.
Self-routing fabric
Cell based, efficient loadbalancing
End-to-end scheduling
Control plane runs on external server
Logical chassis management
Single-box look and feel
Scalable, redundant route state database
Resiliency at all levels FIGS. 15 through 18 illustrate an alternative approach for implementing a logical router 100. The alternative approach includes a routed backplane fabric that uses standalone switches as spine units for the backplane. The backplane itself is based on a Clos fabric stitched via front-panel ports. A routed backplane fabric is realized using the following main components:

Layer 3 (L3) fabric ports
LSoE (link state over ethernet) for fabric neighbor discovery
Border Gateway Protocol shortest path first (BGP-SPF) control plane for inter-unit IP reachability
BGP-SPF extensions for "switch-port" discovery
Multiprotocol Tunnel Switching (MPLS) tunnels setup to/from remote "switch-ports"

Note that LSoE and BGP-SPF are standardized protocols leveraged in this design to build a routed backplane for a disaggregated chassis based logical router 100. Design for such a routed backplane is discussed in more detail below.

Figure 15:
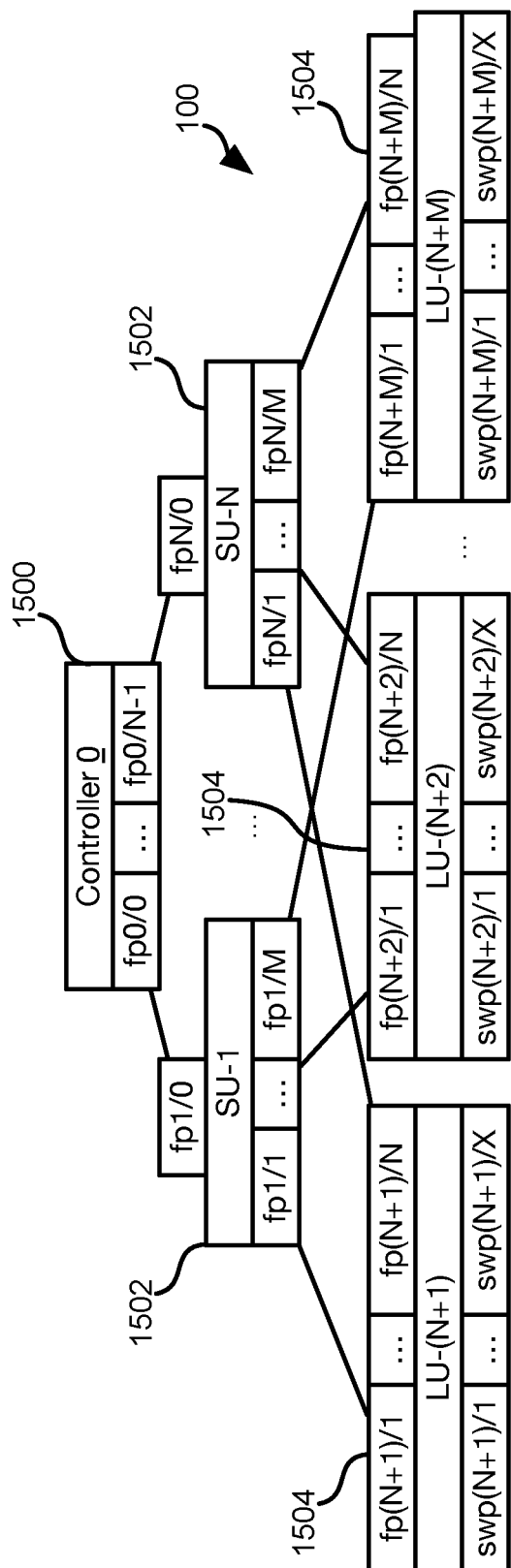
FIG. 15 is a schematic block diagram of a standalone logical router in accordance with an embodiment of the present invention.

FIG. 15 illustrates the physical connectivity of a logical router 100 implemented using a standalone backplane structure. In this implementation, a centralized controller 1500 is interfaced with N spine units 1502 (SU-1 to SU-N). Each of the front panel ports of each spine unit 1502 may be designated as a fabric port. The system also includes M line units 1504 (LU−N+1 to LU−N+M). The back panel ports of the line units 1504 may also be designated as fabric ports. The controller may likewise implement fabric ports coupled to the spine units 1502. Each of the N spine units 1502 may be interfaced with each of the M line units 1504 using the fabric ports of the spine units 1502 and the fabric ports of line units 1504. Furthermore, each of the M line units 1504 may include X front panel ports, each of which is designated as a switch port. In FIG. 15, the following notation is used:

LU: line unit
SU: spine unit
N: number of spine units
M: number of line units
X: number of switch ports on each line unit
swpA/B: switch port number B on line unit A
fpA/B: fabric port number B on unit A (controller, spine unit, or line unit number from 0 to N+M).

The embodiment of FIG. 15 may use the same Clos connectivity that is described above with respect to FIGS. 1 through 14. The Clos connectivity may be used to distribute internal switch state resulting from user configuration and a routing control plane, as well as for runtime operational data that needs to flow across units 1502, 1504 in order to implement the standalone backplane structure.

The backplane fabric implemented by the interconnections between the fabric ports of the spine units 1502 and the line units 1504 provides data traffic packet transport across all line-units 1504 and controllers 1500. An MPLS routed fabric may be used as a transport underlay across all line unit 1504 and controller fabric ports. The fabric may have some or all of the following properties:

Each of line unit 1504 fabric-port is auto-configured as a layer-3 routed port in an internal fabric-VRF (virtual routing and forwarding) with a private IP (internet protocol) address.

BGP-SPF is used as internal fabric routing protocol to establish layer 3 reachability across all fabric ports within the fabric-VRF.

Each line-unit 1504, spine-unit 1502, and controller node 1500 runs an instance of BGP-SPF routing protocol on its local fabric ports.

LSoE is used as the discovery protocol to discover layer-3 fabric neighbors and corresponding encapsulations.

LSoE learned neighbors are pushed into BGP to bring-up BGP-SPF sessions over directly connected layer-2 fabric ports.

BGP-SPF peering is established on each leaf-spine connection in the fabric as a result.

Fabric topology is learned on each node and fabric-VRF IP reachability is established to each routed fabric-port via BGP-SPF computation.

An MPLS transport is setup further and is described in more detail later in this document.

Most external facing control planes for the logical router 100 that include external BGP peerings, IGP (interior gateway protocol) routing protocols, ARP, and ND (neighbor discovery) may be hosted on the controller node 1500. In other words, besides the backplane fabric control plane that is distributed across all nodes 1500, 1502, 1504, most logical router control plane functions may be centralized on the controller node 1500. The illustrated architecture will however allow specific functions (such as BFD (bidirectional forwarding detection), LLDP (link layer discovery protocol), VRRP (virtual router redundancy protocol), and LSoE) to be distributed across line units 1504 as needed. Data paths of the units 1502, 1504 may be accordingly programmed to send locally bound packets to either the local CPU (for distributed functions) or to send them to controller node 1500 (to implement the centralized control plane).

The centralized logical router control plane running on the controller node 1500 drives programming of a data-plane that is distributed across the line units 1504. A one-stage forwarding model is defined as one in which (a) all layer 3 route look-ups are done on the ingress line-units 1504 and (b) resulting rewrites and egress port are resolved on ingress line-unit 1504. All resulting encapsulation rewrites are put on the packet and packet is sent to egress line-unit 1504 over the backplane transport fabric with the resulting egress port information. All packet editing happens on the ingress line-unit 1504. Egress line unit 1504 simply forwards the packet on the egress port 1504. A one-stage forwarding model, as defined above is simulated across standalone line-units 1504 in this logical router 100 to accomplish layer-3 forwarding across line-units:

L1 rewrites are resolved and written on the ingress line unit (LU) 1504

Packets are tunneled to egress-LU 1504 over MPLS tunnel

MPLS label resolves egress-port on the egress-LU 1504

In some embodiments, all line unit 1504 front panel ports (except for ports designated as fabric-ports) are designated as external switch-ports as noted above. Each of these switch-ports would be represented as an interface in the logical router 100. All logical router interfaces would be represented in a data plane, a control plane, and a management plane on the controller 1500, as well as in a data plane on all line-units 1504. For example, an interface "swp3/2" representing port 2 on line-unit 3 would be programmed in the data plane on all the line-units 1504. It would also be visible in the management plane hosted on the controller node 1500 and in the routing control plane hosted on the controller 1500.

In some embodiments, all router interfaces, including ones on remote line units 1504 are programmed in the data plane on each line unit 1504 in order to accomplish one-stage forwarding across line units 1504 as defined above. A local interface on a line unit 1504 simply resolves to a local port. However, a remote interface on a line unit 1504 is programmed in the data plane such that a packet egressing this remote interface is sent to the remote line unit 1504 to be egressed out of the corresponding router port on the remote line unit 1504. An underlay fabric transport tunnel is setup to stitch the data path to the egress line unit 1504 for this purpose and an overlay encapsulation may be used to identify the router port on the egress line unit 1504.

There are a couple of choices with respect to transport tunnel and overlay encapsulation that may be used for this purpose:

A pure IP fabric transport (IP tunnel) and VXLAN (virtual extensible LAN) overlay encapsulation (such as a virtual network identifier (VNID)) to identify the egress port An MPLS fabric transport (such as label switched path (LSP)) and a MPLS overlay internal-label to identify the egress port An MPLS transport and overlay may be used in this architecture. However, overall architecture does not preclude using an IP transport with a VXLAN tunnel to accomplish the same.

In order to improve or optimize the number of internal label encapsulations put on the packet, both the transport label and the interface label may be collapsed into a single label that both identifies a physical port and provides a transport LSP to or from the line unit 1504 hosting the physical interface. This overlay label identifies the egress interface for egress traffic switched towards the egress line unit 1504 (e.g., egress line card) and interface, as well as identifying an ingress interface for ingress traffic on the interface that needs to be punted to the controller 1500 that hosts routing protocols running on that interface. Two internal label allocations may be defined for this purpose:

egress-label allocated per-local-(LC, port), used to tunnel from ingress-LU to remote-egress-port, identifies egress-port for switched traffic ingress-label allocated per-(controller, port), used to tunnel from ingress-LU to controller, identifies ingress-port for host destined traffic Each of the above label contexts may be globally scoped across all nodes 1500, 1502, 1504 within the logical router 100 and identify both the physical port as well as a directed LSP. The above label allocation scheme essentially results in two global labels being allocated for each router-port within the logical router 100. MPLS labels may be statically reserved and assigned for this purpose on switch-port interface discovery and these reserved labels would not available for external use in some embodiments.

A globally scoped label (across all logical router nodes 1500, 1502, 1504) that is allocated for each local router port of each line unit 1504 identifies both the egress router-port as well as a transport LSP from ingress line-unit to the egress line-unit that hosts the physical port. This label is programmed on logical router nodes 1500, 1502, 15014 as follows:

On the ingress line-unit 1504, this label is part of the tunnel encapsulation result to be rewritten on the packet to egress out of a remote interface.

On the spine-unit 1502, this label switches to egress line unit fabric-next-hop rewrite with the same egress label.

On the egress line-unit, this label simply points to the egress interface (with no packet rewrite.

Figure 16:
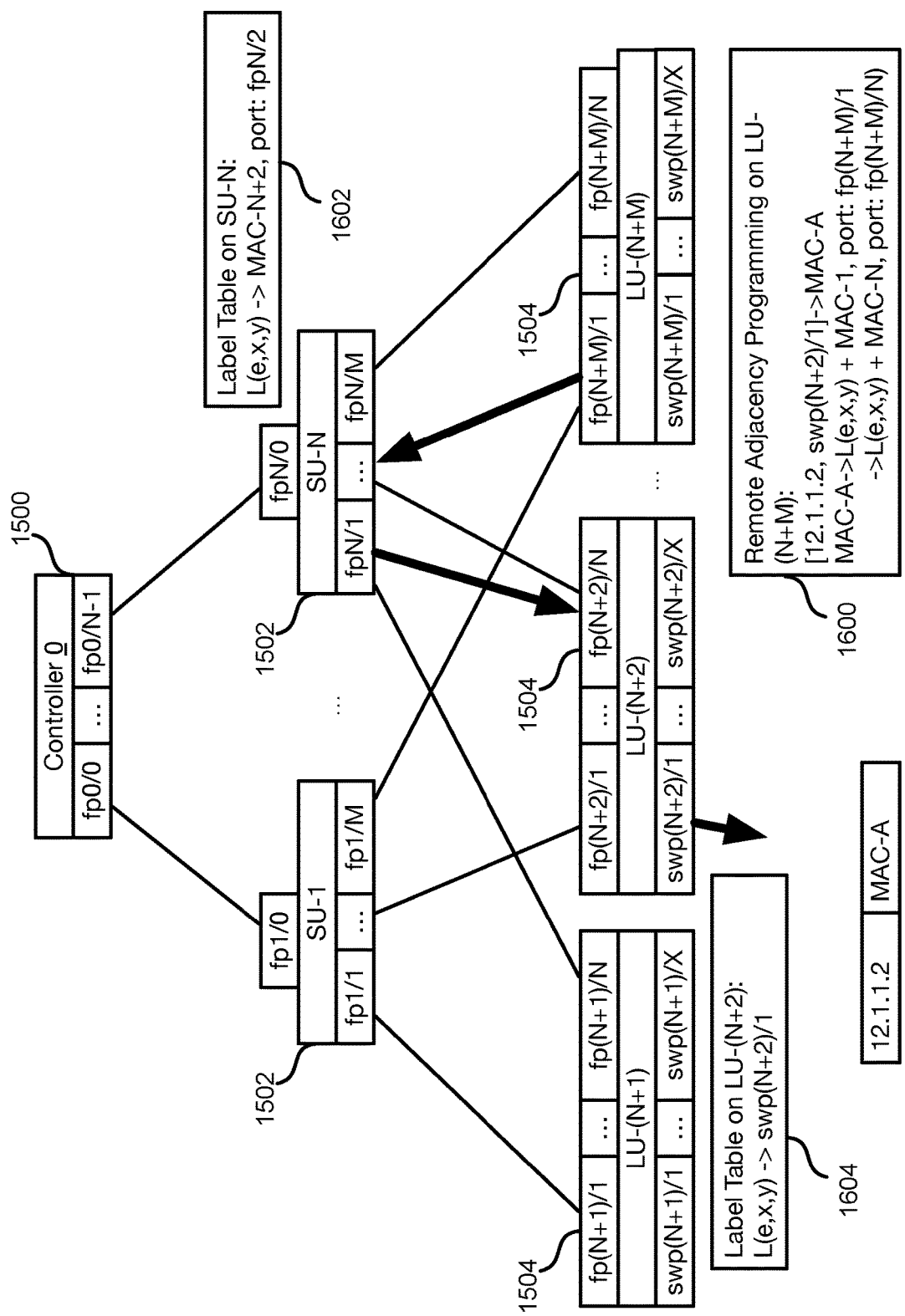
FIG. 16 is a schematic block diagram of the standalone logical router of FIG. 15 including tables for labeling of packets from an ingress port to an egress port in accordance with an embodiment of the present invention.

This process is illustrated in FIG. 16. The following notation is used in FIG. 16:

L(e, x, y): egress label for switch port x on LU-y
L(I,x,y): ingress label for switch port x on LU-Y
MAC-x: router MAC (machine access code) of unit X A packet may be received by an ingress line unit 1504 (LU–(N+M)). Upon exiting the ingress line unit LU–(N+M), the packet is labeled according to the illustrated label table 1600, which includes the egress interface ("[12.1.1.2, swp(N+2)/1]→MAC-A") as well as the transport LSP, i.e. tunnel path, to the egress interface ("MAC-A→L(e,x,y)+MAC-1, port: fp(N+M)/1→L(e,x,y)+MAC-N, port: fp(N+M)/N"). The packet is sent to a spine unit 1502 (SU-N). The spine unit SU-N rewrites the packet according to the label table 1602 that includes the fabric-next-hop rewrite ("L(e, x,y)→MAC-N+2, port:fpN/2") and the egress label. The spine unit SU-N forwards the rewritten packet to the egress line unit 1504 (LU(N+2)), which transforms the label of the packet according to the table 1604 that simply points to the egress interface (L(e,x,y)→swp(N+2)/1).

Figure 17:
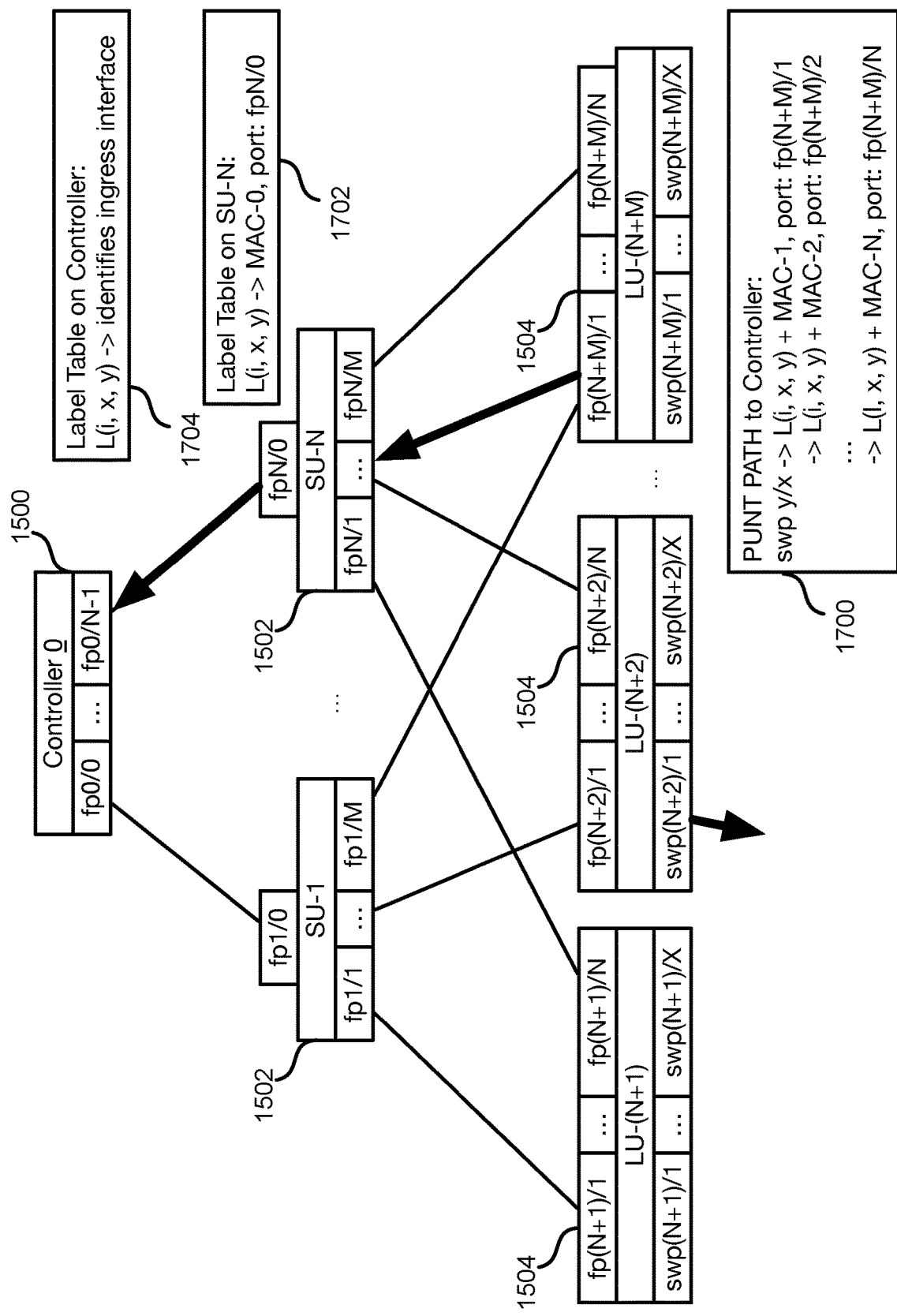
FIG. 17 is a schematic block diagram of the standalone logical router of FIG. 15 including tables for labeling of packets routed to a controller in accordance with an embodiment of the present invention.

Referring to FIG. 17, a globally scoped label (across all logical router nodes 1500, 1502, 1504) may be allocated per-(controller, router-port) and identifies both the ingress router-port as well as a transport LSP from ingress line-unit to the controller card. This label is programmed on logical router nodes as follows:

On the ingress line unit 1504, this label is part of the tunnel encapsulation result to be rewritten on the packet for packet punted to the controller (see table 1700 of FIG. 17 on line unit LU–(N+M)

On the spine unit 1502, this label simply switches to controller fabric-next-hop rewrite with the same egress label (see table 1702 on spine unit SU-N)

On the controller 1500, this label identifies the ingress interface in the host stack (see table 1704)

Punted packets need to be injected into the LINUX kernel making it look as if they arrived on the Linux interface corresponding to the front panel port the packet arrived on. On a standalone system, the host path runs in the LINUX Kernel running on the local CPU of the switch, i.e. line unit 1504, which would be the line unit LU–(N+M) in the example of FIG. 17. An ASIC on the line unit 1504 adds a system header that indicates which ingress interface the packet arrived on. A BCM Knet module in the kernel then maps the hardware ingress interface to the LINUX interface and injects the packet into the LINUX data path.

In the illustrated architecture, the host data path runs in multiple places. On the line unit 1504, packets may need to be punted to the BGP LSVR (link state vector routing) instance running on that line unit 1504. If the packet is destined to a control plane protocol instance running on the controller 1500, then the line unit 1504 needs to be able to deliver the packet to the controller. Since there is no system header in this path, the ingress interface needs to be identified and encapsulated within the packet itself.

As mentioned in the earlier sections, this is achieved using a unique label that identifies the ingress interface. An ACL rule can be used to match on the ingress interface and supply the corresponding label and the subsequent forwarding chain. However, this result needs to be used only when the packet really needs to be sent to the controller 1500. In other cases, the forwarding lookup should drive the encapsulations.

Figure 18:
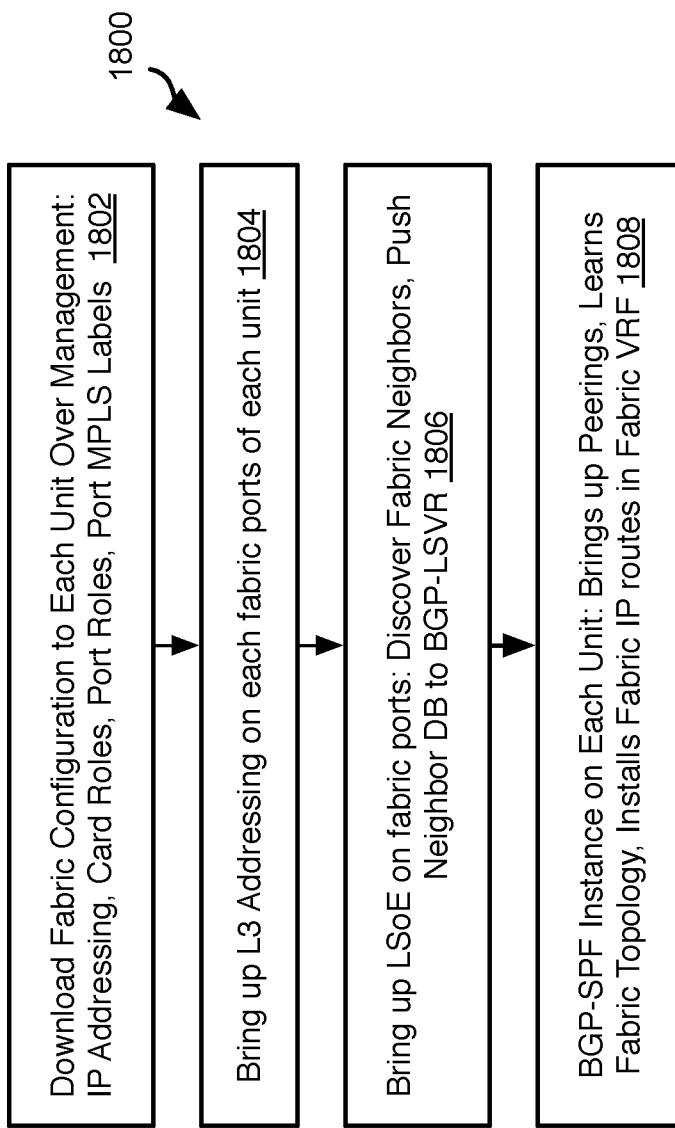
FIG. 18 is a process flow diagram of a method for bringing up the standalone logical router in accordance with an embodiment of the present invention.

FIG. 18 illustrates an approach for bringing up the standalone backplane fabric according to the approach of FIGS. 15 through 17. Bringing up the backplane fabric and programming happens automatically on boot-up without any explicit user configuration or intervention such that:

layer-3 (L3) backplane reachability is established across all layer-3 enabled fabric ports within a fabric-VRF overlay transport tunnels are setup to/from all router-ports across all logical router components: line units 1504, spine units 1502, and controller 1500.

As shown in FIG. 18, a method 1800 for bringing up the backplane fabric may include downloading 1802 fabric configuration to each unit 1500, 1502, 1504 being managed. This may include IP addressing, card roles, port roles, and port-MPLS labels. The method 1800 further includes bringing up 1804 L3 addressing on the fabric ports of each unit 1500, 1502, 1504. The method 1800 may further include bringing up 1806 LSoE on fabric ports, which includes discovering fabric neighbors and pushing each unit's 1500, 1502, 1504 neighbor database acquired in this manner to a BGP-LSVR on the controller 1500. The method 1800 may further include performing 1808, by a BGP-SPF instance on each unit 1500, 1502, 1504: bringing up peerings, learning fabric topology, and installing fabric IP routes in the fabric VRF Auto-bring-up of layer-3 backplane fabric may be orchestrated according to the explanation below in which R0 refers to the controller 1500.

Auto-Configure R0 with a Startup Config:

Assume R0 has been imaged and management Ethernet (ma1) is up and addressed. R0 reads a start-up configuration file (packaged with the image) that has the following:

The topology: spine-units, line-units
Private addressing for its southbound fabric interfaces
MPLS labels for overlay interface tunnels
Management IP address pool for line-unit ma1s
ZTP (zero touch provisioning)/start-up config for line-units and spine-units Bring-Up Line-Units:

R0 brings its southbound fabric interfaces up (spine units 1502 and line units 1504 in the topology of FIGS. 15 through 8) with addressing from the start-up configuration file.

R0 runs dhcpd (dynamic host configuration protocol daeomon) so line units' 1504 and spine units' 1502 management ethernets ma1s can get addresses from a pool given in the startup configuration file. The line card numbers for the units 1502, 1504 are assumed to be the R0 port to which they are wired. R0 runs a ZTP service to the units 1502, 1504.

Push Startup Configuration to Line-Units:

R0 pushes startup configuration to the line units 1504 and spine units 1502. This configuration identifies a card role for each unit 1502, 1504; identifies each local port as "fabric-port" or "router-port," specifies northbound fabric interface addressing, and provides MPLS labels for router-port overlay tunnels (two labels per port).

The units 1502, 1504 then run LSoE on fabric ports to make sure they are wired as expected from the startup configuration. LSoE discovers layer-3 fabric neighbors and corresponding encapsulations. The database of information learned by LSoE is exported into BGP-SPF, as per standard LSoE function.

BGP-SPF peering is established on each line unit-to-spine unit fabric link. Fabric topology is learned on each unit 1502, 1504 and fabric-VRF IP reachability is established to each routed fabric-port via BGP-SPF computation. BGP-SPF programs each local line-unit/spine-unit RIBs (router information base) with fabric routes within the fabric-VRF. At this point, there is IP reachability across all fabric port IP addresses.

Switch-Port Discovery and Tunnel Bring-Up:

Local router ports may be discovered on each line unit 1504. Discovered router ports along with assigned MPLS labels are pushed into local BGP-LSVR instances on each line unit 1504. BGP-SPF may be enhanced further to be able to carry ports+labels independent of IP addressing. Accordingly, BGP-SPF may be configured to compute shortest path first (SPF) SPF to each "switch-port" in the logical router. BGP-SPF, may also incorporate these external switch-ports into its fabric-VRF topology independent of the user VRF that they are configured in. BGP on each unit 1504 instantiates ingress/egress overlay MPLS tunnels for each interface that resolve via fabric-VRF next-hops. Tunnel reachability may be resolved via fabric-VRF next-hops and tunnels may be programmed as described earlier with assigned MPLS label on each unit 1504.

User configuration on R0 follows the bringing up of the backplane fabric and may be handled on the controller 1500. Switch state computed as a result of this user configuration and control plane may be further distributed for programming across some or all of the line units 1504.

Example Packet Paths

This section goes over how some common packet paths would work in the system using data path programming of the control node 1500 and units 1502, 1504 described in earlier sections.

ARP Resolution

Glean Processing on a unit 1502, 1504 is performed by an ingress L3 route lookup on destination IP address that resolves to an incomplete next-hop or subnet (glean) route that is programmed pointing to PUNT path. The PUNT path is pre-programmed pointing to ingress-interface-tunnel to the controller 1500. An ingress layer-2 packet is encapsulated with ingress-interface-label+rewrite to fabric-spine-next-hop. The encapsulated packet is transmitted on the fabric port to one of the spine units 1502. The spine unit 1502 terminates outer layer-2. An MPLS in-label lookup on the spine unit 1502 points to ingress-interface-label+rewrite to fabric-controller-next-hop. This information is used to route the packet to the controller 1500. The controller terminates outer layer-2. The controller 1500 is programmed to perform an MPLS in-label lookup action as POP (point of presence) and identifies the ingress interface context. The controller performs an L3 route lookup on the destination IP of the packet and resolves to an incomplete next-hop or subnet (glean) route. The controller 1500 then delivers the packet using the next-hop or subnet route for ARP resolution with the ingress interface.

ARP Request

The controller 1500 generates a broadcast ARP request on the ingress L3-interface. The controller L3-interface resolves to egress-interface-tunnel port. The ARP packet of the broadcast ARP request is encapsulated with egress-interface-label+rewrite to fabric-spine-next-hop. The encapsulated packet is transmitted on the fabric port to one of the spine units 1502. The spine unit 1502 terminates outer layer-2. An MPLS in-label lookup on the spine unit 1502 points to egress-interface-label+rewrite to fabric-line-unit-next-hop. The encapsulated packet is transmitted on the fabric port to the egress line unit 1504 according to the MPLES in-label lookup. The egress line-unit 1504 terminates outer layer-2. The egress line unit 1504 performs an MPLS in-label lookup, resulting in POP and forward on an egress interface of the egress line unit identified from the MPLS in-label look up.

ARP Reply

ARP reply packets may be programmed with a PUNT path to the controller 1500. The PUNT path is pre-programmed and points to an ingress-interface-tunnel to the controller 1500. An ingress L2 ARP packet from a line unit 1504 may be encapsulated with ingress-interface-label+rewrite to fabric-spine-next-hop according to the PUNT path. The encapsulated packet is transmitted on the fabric port to one of the spine units 1502. The spine unit 1502 terminates the outer layer-2. An MPLS in-label lookup on the spine unit 1502 points to ingress-interface-label+rewrite to fabric-controller-next-hop. This information is used to forward the ARP packet to the controller 1500.

The controller 1500 terminates outer layer-2. The controller 1500 performs an MPLS in-label lookup action and is programmed as POP. The controller 1500 identifies the ingress interface context according to the lookup action. The inner packet encapsulated in the packet from the line unit 1504 is identified as an ARP packet and delivered to ARP module executing on the controller 1500, which processes the ARP reply according to address resolution protocol (ARP).

Ingress LC→Egress LC Routed Packet Walk

The ingress line unit 1504 performs an ingress L3 route lookup on destination IP of a packet and resolves to next-hop rewrite, L3-egress-interface, L2-egress-interface-tunnel-port. The packet is re-written with next-hop rewrite result from the route lookup and VLAN editing derived from egress L3-interface and L2-port. The resulting layer-2 packet is encapsulated with egress-interface-label+rewrite to fabric-spine-next-hop. The encapsulated packet is transmitted on the fabric port to one of the spine units 1504 according to the fabric-spine-next-hop. The spine unit 1504 receives the encapsulated packet, terminates the outer layer-2, and performs an MPLS in-label lookup that points to egress-interface-label+rewrite to fabric-egress-line-unit-next-hop. The spine unit 1504 transmits the encapsulated packet to the egress line unit 1504 referenced by the fabric-egress-line-unit-next hope. The egress line unit 1504 terminates the outer layer-2, performs an MPLS in-label lookup result to obtain POP and forwards the encapsulated packet on an egress interface of the egress line unit 1504 referenced by the encapsulated packet.

Figure 19:
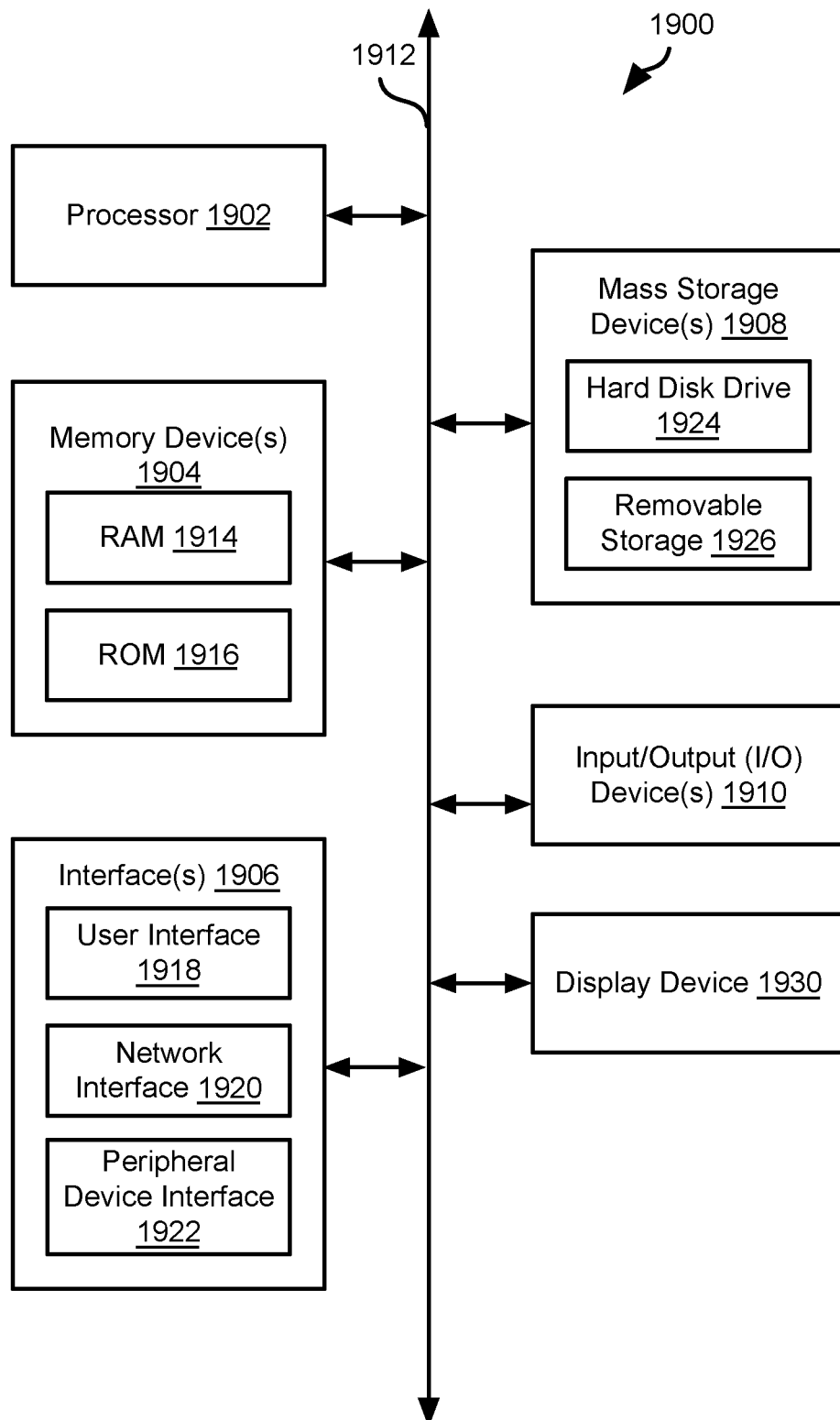
FIG. 19 is a schematic block diagram of a computer system suitable for implementing methods in accordance with embodiments of the present invention.

FIG. 19 is a block diagram illustrating an example computing device 1900 which can be used to implement the system and methods disclosed herein, such as a control plane element 300, controller 1500, or the various elements 102, 104, 1502, 1504 of the logical router 100.

Computing device 1900 may be used to perform various procedures, such as those discussed herein. Computing device 1900 can function as a server, a client, or any other computing entity. Computing device can perform various monitoring functions as discussed herein, and can execute one or more application programs, such as the application programs described herein. Computing device 1900 can be any of a wide variety of computing devices, such as a desktop computer, a notebook computer, a server computer, a handheld computer, tablet computer and the like.

Computing device 1900 includes one or more processor(s) 1902, one or more memory device(s) 1904, one or more interface(s) 1906, one or more mass storage device(s) 1908, one or more Input/Output (I/O) device(s) 1910, and a display device 1930 all of which are coupled to a bus 1912. Processor(s) 1902 include one or more processors or controllers that execute instructions stored in memory device(s) 1904 and/or mass storage device(s) 1908. Processor(s) 1902 may also include various types of computer-readable media, such as cache memory.

Memory device(s) 1904 include various computer-readable media, such as volatile memory (e.g., random access memory (RAM) 1914) and/or nonvolatile memory (e.g., read-only memory (ROM) 1916). Memory device(s) 1904 may also include rewritable ROM, such as Flash memory.

Mass storage device(s) 1908 include various computer readable media, such as magnetic tapes, magnetic disks, optical disks, solid-state memory (e.g., Flash memory), and so forth. As shown in FIG. 19, a particular mass storage device is a hard disk drive 1924. Various drives may also be included in mass storage device(s) 1908 to enable reading from and/or writing to the various computer readable media. Mass storage device(s) 1908 include removable media 1926 and/or non-removable media.

I/O device(s) 1910 include various devices that allow data and/or other information to be input to or retrieved from computing device 1900. Example I/O device(s) 1910 include cursor control devices, keyboards, keypads, microphones, monitors or other display devices, speakers, printers, network interface cards, modems, lenses, CCDs or other image capture devices, and the like.

Display device 1930 includes any type of device capable of displaying information to one or more users of computing device 1900. Examples of display device 1930 include a monitor, display terminal, video projection device, and the like.

Interface(s) 1906 include various interfaces that allow computing device 1900 to interact with other systems, devices, or computing environments. Example interface(s) 1906 include any number of different network interfaces 1920, such as interfaces to local area networks (LANs), wide area networks (WANs), wireless networks, and the Internet. Other interface(s) include user interface 1918 and peripheral device interface 1922. The interface(s) 1906 may also include one or more user interface elements 1918. The interface(s) 1906 may also include one or more peripheral interfaces such as interfaces for printers, pointing devices (mice, track pad, etc.), keyboards, and the like.

Bus 1912 allows processor(s) 1902, memory device(s) 1904, interface(s) 1906, mass storage device(s) 1908, and I/O device(s) 1910 to communicate with one another, as well as other devices or components coupled to bus 1912. Bus 1912 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1900, and are executed by processor(s) 1902. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The invention claimed is:

1. A system comprising:
    a plurality of disaggregated network elements coupled by a network and not coupled to one another by a common backplane of a chassis; and
    a controller coupled to the plurality of disaggregated network elements and programmed to configure to program the plurality of disaggregated network elements to function as a logical router;
    wherein the plurality of disaggregated network elements include line units defining front panel ports and spine units, the line units all being coupled to the spine units by the network;
    wherein the controller is programmed to configure each line unit such that:
        a packet is received on an ingress port of the front panel ports of the each line unit;
        the each line unit determines an egress port of the front panel ports of a second line unit according to the packet;
        the each line unit labels the packet with the egress port to obtain a labeled packet; and
        the each line unit transmits the labeled packet over the network.

2. The system of claim 1, wherein the controller is programmed to configure each line unit to transmit the labeled packet over the network through a tunnel to the egress port.

3. The system of claim 2, wherein the tunnel is a multi-protocol tunnel switching (MPLS) tunnel.

4. The system of claim 1, wherein each line unit is programmed to label the packet with a first globally scoped label identifying the egress port.

5. The system of claim 4, wherein each line unit is programmed to label the packet with a second globally scoped label identifying a label switched path to the egress port.

6. The system of claim 1, wherein each spine unit is programmed to:
    receive the labeled packet from the each line unit;
    rewrite the labeled packet according to a label table stored on the each spine unit to obtain a rewritten packet; and
    forward the rewritten packet to the second line unit.

7. The system of claim 1, wherein the plurality of disaggregated network elements are configured to operate as a standalone backplane.

8. The system of claim 7, wherein the plurality of disaggregated network elements are programmed to autonomously:
    perform discovery of one another over the network; and
    configure overlay tunnels to and from all ports of the plurality of disaggregated network elements.

9. The system of claim 1, wherein the controller is programmed to program roles of the plurality of disaggregated network elements as either a line unit or a spine unit.

10. The system of claim 1, wherein the controller is programmed to:
    download a fabric configuration to each element of the plurality of disaggregated network elements;
    bring up level 3 (L3) addressing on fabric ports of the each element;
    bring up link state over ethernet (LSoE) on the fabric ports of the each element;
    invoke a module on the each element to bring up peerings with the fabric ports of other elements of the plurality of disaggregated network elements, learn topology of a fabric formed by the plurality of disaggregated network elements and the network, and install fabric routes.

11. A method comprising:
    providing a plurality of disaggregated network elements coupled by a network and not coupled to one another by a common backplane of a chassis, the plurality of disaggregated network elements include line units defining front panel ports and spine units, the line units all being coupled to the spine units by the network;

providing a controller coupled to the plurality of disaggregated network elements and programmed to configure to program the plurality of disaggregated network elements to function as a logical router;

programming, by the controller, the plurality of disaggregated network elements;

performing, by a first line unit of the line units:
- receiving a packet on an ingress port of the front panel ports of the first line unit;
- determining an egress port of the front panel ports of a second line unit according to the packet;
- labeling the packet with the egress port to obtain a labeled packet; and
- transmitting the labeled packet over the network.

12. The method of claim 11, further comprising transmitting, by the first line unit, the labeled packet over the network through a tunnel to the egress port.

13. The method of claim 12, wherein the tunnel is a multiprotocol tunnel switching (MPLS) tunnel.

14. The method of claim 11, wherein labeling the packet with the egress port comprises labeling the packet a first globally scoped label identifying the egress port.

15. The method of claim 14, wherein labeling the packet with the egress port further comprises labeling the packet with a second globally scoped label identifying a label switched path to the egress port.

16. The method of claim 11, further comprising performing, by a first spine unit of the spine units:
- receiving the labeled packet from the first line unit;
- rewriting the labeled packet according to a label table stored on the first spine unit to obtain a rewritten packet; and
- forwarding the rewritten packet to the second line unit.

17. The method of claim 11, wherein the plurality of disaggregated network elements are configured to operate as a standalone backplane.

18. The method of claim 17, further comprising, performing, by the plurality of disaggregated network elements:
- performing discovery of one another over the network; and
- configure overlay tunnels to and from all ports of the plurality of disaggregated network elements.

19. The method of claim 11, further comprising programming, by the controller, roles of the plurality of disaggregated network elements as either a line unit or a spine unit.

20. The method of claim 11, further comprising performing, by the controller:
- downloading a fabric configuration to each element of the plurality of disaggregated network elements;
- bringing up level 3 (L3) addressing on fabric ports of the each element;
- bringing up link state over ethernet (LSoE) on the fabric ports of the each element; and
- invoking a module on the each element to bring up peerings with the fabric ports of other elements of the plurality of disaggregated network elements, learn topology of a fabric formed by the plurality of disaggregated network elements and the network, and install fabric routes.

* * * * *